(12) United States Patent
Heppe et al.

(10) Patent No.: US 8,140,200 B2
(45) Date of Patent: Mar. 20, 2012

(54) TURRET ASSEMBLIES FOR SMALL AERIAL PLATFORMS, INCLUDING UNMANNED AIRCRAFT, AND ASSOCIATED METHODS

(75) Inventors: Stephen B. Heppe, Hood River, OR (US); Andreas H. von Flotow, Hood River, OR (US); Aram Soghikian, Hood River, OR (US)

(73) Assignee: Insitu, Inc., Bingen, WA (US)

( * ) Notice: Subject to any disclaimer, the term of this patent is extended or adjusted under 35 U.S.C. 154(b) by 1108 days.

(21) Appl. No.: 11/932,545

(22) Filed: Oct. 31, 2007

(65) Prior Publication Data
US 2009/0216394 A1    Aug. 27, 2009

Related U.S. Application Data

(60) Provisional application No. 60/857,868, filed on Nov. 9, 2006.

(51) Int. Cl.
*G06F 19/00* (2011.01)
(52) U.S. Cl. ..................... 701/16
(58) Field of Classification Search ........... 701/1, 3, 701/13, 15, 16, 120; 89/37, 16
See application file for complete search history.

(56) References Cited

U.S. PATENT DOCUMENTS

| | | |
|---|---|---|
| 3,085,354 A | 4/1963 | Rasmussen et al. |
| 3,567,163 A | 3/1971 | Kepp et al. |
| 3,638,502 A | 2/1972 | Leavitt et al. |
| 4,643,539 A | 2/1987 | Brignall et al. |
| 4,728,839 A | 3/1988 | Coughlan et al. |
| 4,736,218 A | 4/1988 | Kutman et al. |
| 4,989,466 A | 2/1991 | Goodman |
| 5,088,818 A | 2/1992 | Nicholson et al. |
| 5,184,521 A | 2/1993 | Tyler |
| 5,347,910 A | 9/1994 | Avila et al. |
| 5,383,645 A | 1/1995 | Pedut et al. |
| 5,589,901 A | 12/1996 | Means |
| 5,687,249 A | 11/1997 | Kato et al. |

(Continued)

FOREIGN PATENT DOCUMENTS

WO    WO-2004067432    8/2004

(Continued)

OTHER PUBLICATIONS

Nettmann Systems International, Gyron DSG (Dual Sensor Gyro Stabilized Gimbal Positioning Video Cameral), Internet, pp. 1-4.

(Continued)

*Primary Examiner* — Kim T Nguyen
(74) *Attorney, Agent, or Firm* — Perkins Coie LLP

(57) ABSTRACT

Turret assemblies for small aerial platforms, including unmanned aircraft, and associated methods. In one embodiment, an aircraft system can include a turret assembly having a payload with a line of sight to a target and a gimbal system carrying the payload. The gimbal system can include (a) a first support coupled to a first actuator to rotate about a first axis, and (b) a second support carried by the first support and coupled to a second actuator to rotate about a second axis generally transverse to the first axis. The turret assembly can also include a controller configured to direct movement of at least one of the first actuator and the second actuator such that the line of sight is pointed away from a point of impact before the turret assembly contacts the ground or another external structure during landing or capture operations.

43 Claims, 10 Drawing Sheets

U.S. PATENT DOCUMENTS

| | | |
|---|---|---|
| 5,897,223 A | 4/1999 | Tritchew et al. |
| 5,954,310 A | 9/1999 | Soldo et al. |
| 5,967,458 A | 10/1999 | Williams et al. |
| 6,323,898 B1 | 11/2001 | Koyanagi et al. |
| 6,424,804 B1 | 7/2002 | Johnson et al. |
| 6,672,535 B2 | 1/2004 | Brunner, Jr. et al. |
| 6,798,984 B2 | 9/2004 | Antikidis et al. |
| 6,820,531 B1 | 11/2004 | Cianciolo |
| 6,849,980 B1 | 2/2005 | Voigt et al. |
| 7,000,883 B2 | 2/2006 | Mercadal et al. |
| 2003/0155463 A1 | 8/2003 | Cox et al. |
| 2004/0183917 A1 | 9/2004 | von Flotow et al. |
| 2007/0061054 A1* | 3/2007 | Rowe et al. ............ 701/1 |

FOREIGN PATENT DOCUMENTS

| | | |
|---|---|---|
| WO | WO-2004068403 | 8/2004 |
| WO | WO-2004102473 | 11/2004 |

OTHER PUBLICATIONS

Wu, Y.A., "EO target Geolocation Determination," proceedings of the 34th conference on decision & Control, New Orleans, LA, Dec. 1995, pp. 2766-2771, Jul. 1995 IEEE.

* cited by examiner

TURRET ASSEMBLIES FOR SMALL AERIAL PLATFORMS, INCLUDING UNMANNED AIRCRAFT, AND ASSOCIATED METHODS

CROSS-REFERENCE TO RELATED APPLICATION

This application claims the benefit of U.S. Provisional Application No. 60/857,868, filed Nov. 9, 2006, which is incorporated herein by reference in its entirety.

TECHNICAL FIELD

The present disclosure relates generally to turret assemblies for small aerial platforms, including unmanned aircraft, and associated methods.

BACKGROUND

Unmanned aircraft or air vehicles (UAVs) provide enhanced and economical access to areas where manned flight operations are unacceptably costly and/or dangerous. For example, unmanned aircraft outfitted with remotely operated movable cameras can perform a wide variety of surveillance missions, including spotting schools of fish for the fisheries industry, monitoring weather conditions, providing border patrols for national governments, and providing military surveillance before, during, and/or after military operations.

The remotely controlled cameras on unmanned aircraft are typically carried by a gimbal system that controls and stabilizes movement of the camera during operation. The camera and gimbal system are, in turn, generally carried within a clear or at least partially clear housing to protect the camera and gimbal system from environmental damage and/or other external hazards. Such housings are generally glass or plastic domes positioned at or proximate to a nose portion of the aircraft and, in many cases, mounted below the aircraft fuselage.

This location offers excellent visibility for the camera during surveillance operations; however, the camera, the gimbal system, and the housing are highly susceptible to damage during landing. Damage is particularly likely in the case of a "belly landing," which can occur if landing gear is not included (as is the case for many small unmanned systems) or is inoperative. In most cases, belly landings result in significant damage to or complete destruction of the turret's housing, camera, and gimbal system. This can significantly increase operating costs for the aircraft system. In many cases, for example, the cameras used for surveillance operations are extremely complex and expensive devices that can cost more than the rest of the entire aircraft. Furthermore, replacement of the camera, gimbal system, and/or housing can require substantial downtime for the aircraft and, thus, significantly increase the operating costs of such systems.

DETAILED DESCRIPTION

A. Overview

Figure 1:
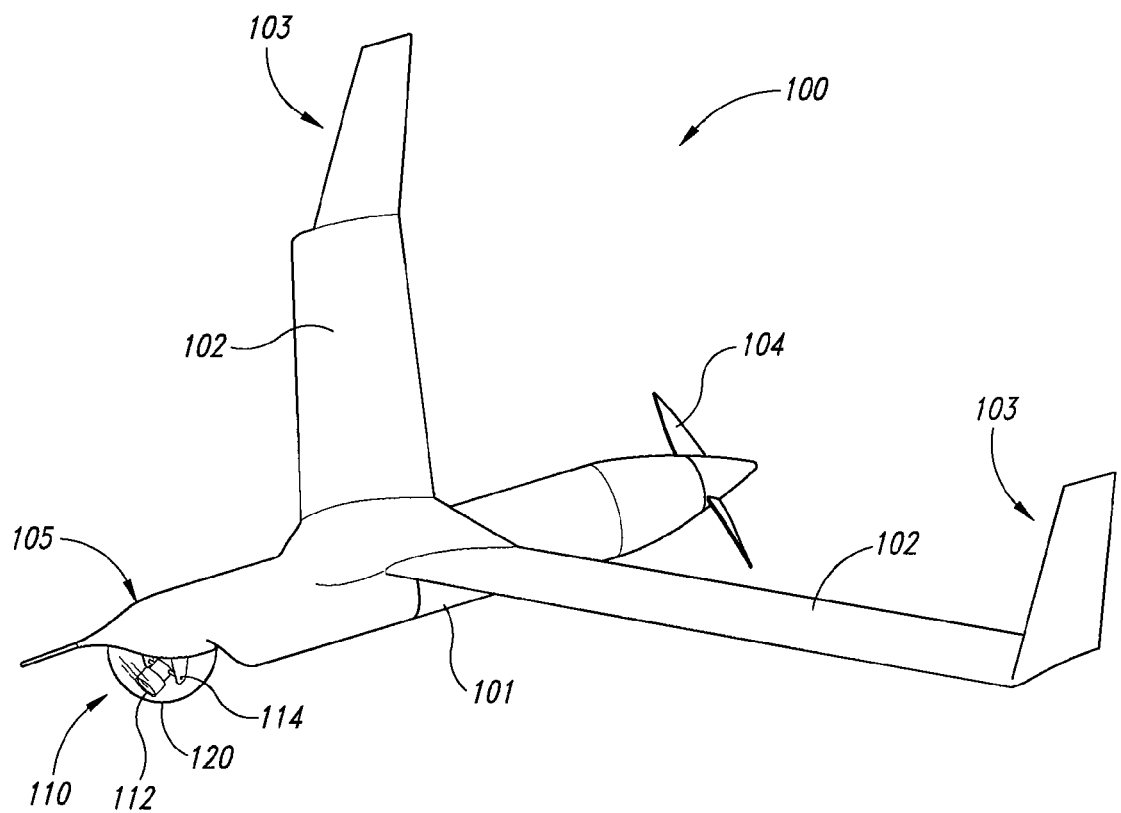
FIG. 1 is a partially schematic, isometric view of an unmanned aircraft including a turret assembly configured in accordance with an embodiment of the disclosure.

The present disclosure describes turret assemblies for small aerial platforms, such as unmanned aircraft, and associated methods for operating such assemblies. An aircraft system in accordance with one embodiment of the disclosure can include a turret assembly carried by an unmanned aircraft. The turret assembly can include a payload having a line of sight to a target and a gimbal system carrying the payload. The gimbal system is movable about a first axis (e.g., a pan axis or a roll axis) and a second axis (e.g., a tilt axis) generally transverse to the first axis. The turret assembly can also include a housing (e.g., a surveillance dome) at least partially surrounding the payload and the gimbal system. The turret assembly can further include a controller operably coupled to the gimbal system to direct movement of the gimbal system about at least one of the first axis and the second axis such that the line of sight is pointed away from a point of impact before the turret assembly contacts the ground or another external structure during landing or capture operations.

In several embodiments, the aircraft system can further include one or more protective portions or "skid pads" carried by the housing and configured to be movable from a first position during airborne operation in which the one or more protective portions are out of the line of sight to a second position in which the one or more protective portions are positioned to directly contact the ground or external structure during landing or capture operations. In several embodiments, the gimbal system can also include a spindle operably coupled between the gimbal system and the aircraft to rotate the gimbal about the first axis. In such embodiments, the aircraft system can include one or more engagement portions carried by the aircraft proximate to the turret assembly. The engagement portions are spaced apart from the turret assembly during airborne operation and configured to engage the turret assembly during landing or capture operations to prevent the spindle from flexing past its elastic limit.

Another aspect of the disclosure is directed toward a method for operating an unmanned aircraft. The method can include flying an unmanned aircraft having payload carried by a turret assembly. The payload can have a line of sight to a target. Before landing or otherwise capturing the aircraft, the method can include moving the payload to direct the line of sight away from an impact point on the ground or another external structure. The method further includes landing the aircraft and, during landing, transferring the landing forces from the turret assembly to other portions of the aircraft by allowing the turret assembly to move into contact with one or more turret engagement portions carried by the aircraft upon impact with the ground or external structure. The one or more turret engagement portions are positioned to restrict or otherwise inhibit movement of the turret assembly relative to the aircraft.

Many specific details of certain embodiments of the disclosure are set forth in the following description and in FIGS. 1-8C to provide a thorough understanding of these embodiments. Well-known structures, systems, and methods often associated with such systems have not been shown or described in detail to avoid unnecessarily obscuring the description of the various embodiments of the disclosure. In addition, those of ordinary skill in the relevant art will understand that additional embodiments of the disclosure may be practiced without several of the details described below.

B. Embodiments of Turret Assemblies for Unmanned Aircraft and Associated Methods FIG. 1 is a partially schematic, isometric view of an unmanned aircraft 100 including a turret assembly 110 configured in accordance with an embodiment of the disclosure. The unmanned aircraft 100 can include a fuselage 101, a pair of wings 102 extending outwardly from the fuselage 101, and a propeller 104 positioned at the aft end of the fuselage 101 to propel the aircraft 100 during flight. Each wing 102 can include an upwardly extending winglet 103 for lateral stability and control. In the illustrated embodiment, the turret assembly 110 is at or proximate to a nose portion 105 of the aircraft 100. In other embodiments, however, the turret assembly 110 can be positioned at a different location on the aircraft 100.

The turret assembly 110 can include a device 112 (shown schematically) carried by a gimbal system 114 (shown schematically). The device 112 can include an imaging device, camera, surveillance sensor, or other payload. The gimbal 114 is configured to move the device 112 relative to the aircraft 100 to acquire and/or track a target located on the ground, at sea, or in the air. The device 112 and gimbal 114 can be positioned behind a surveillance dome or housing 120. As described in greater detail below with reference to FIGS. 2A-3B, the turret assembly 110 is configured to prevent or otherwise inhibit damage to the device 112, the gimbal 114, and/or the surveillance dome 120 during landing, capture, or other high-impact operations.

Figure 2A:
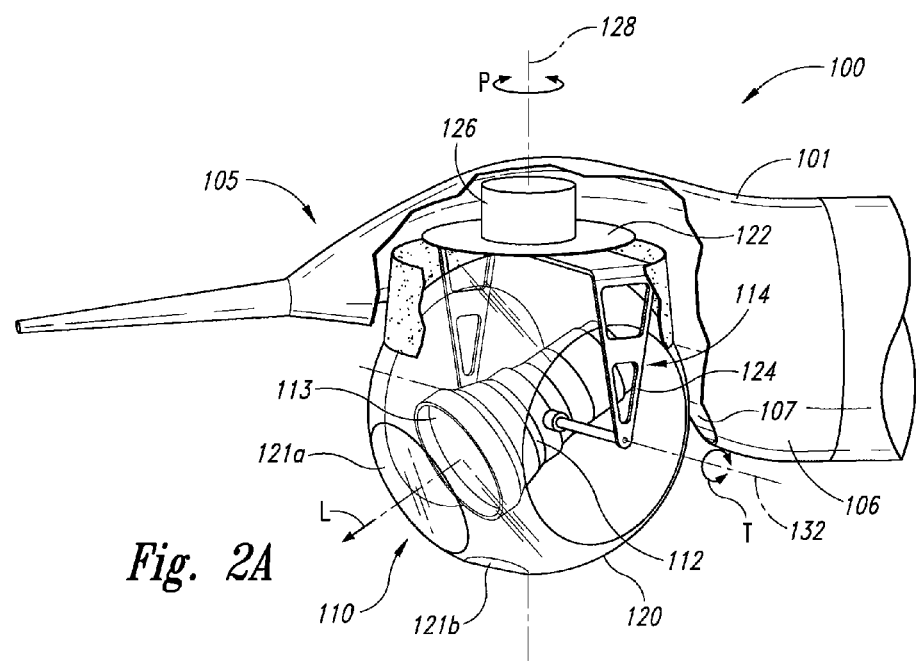
FIGS. 2A-2C are partially schematic, isometric views of the turret assembly of FIG. 1 rotatably moved to three different positions in accordance with an embodiment of the disclosure.
Figure 2B:
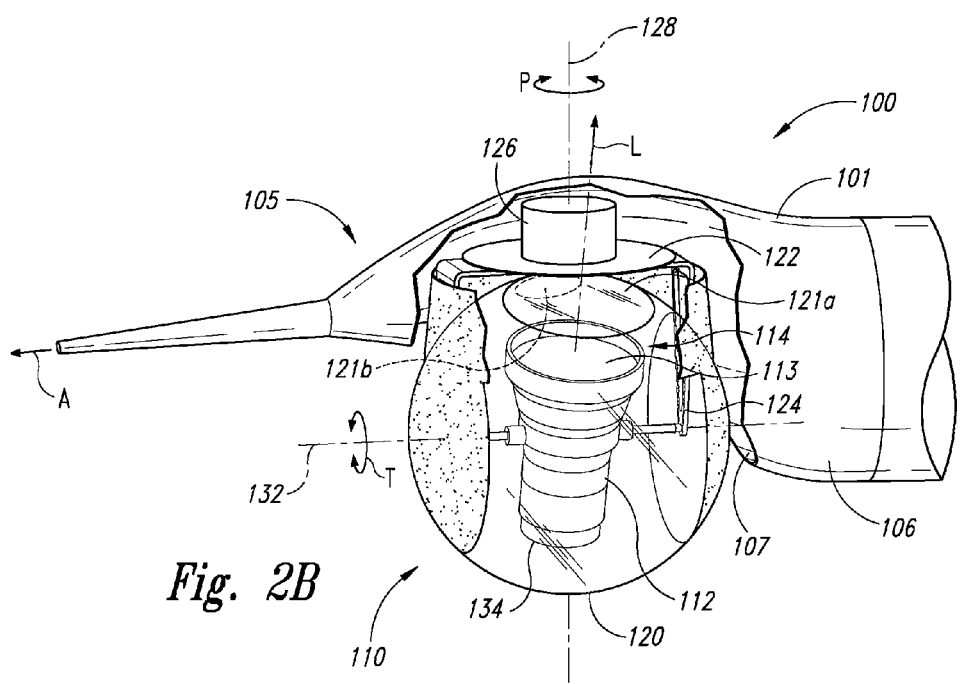
Figure 2C:
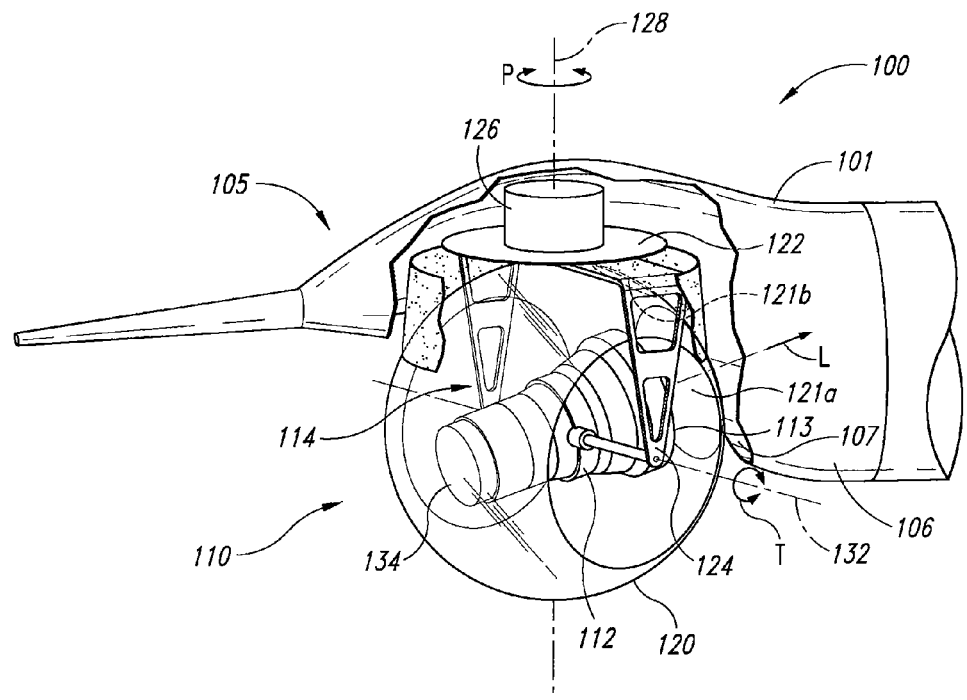

FIGS. 2A-2C are partially schematic, isometric views of the turret assembly 110 rotatably moved to three different positions in accordance with an embodiment of the disclosure. A portion of the aircraft 100 proximate to the turret assembly 110 has been removed in FIGS. 2A-2C so that various components of the turret assembly 110 can be more clearly illustrated. FIG. 2A, for example, is a partially schematic, isometric illustration of the turret assembly 110 in a first position relative to the aircraft 100. In one aspect of this embodiment, the nose portion 105 can include a conical section 106 having a forward-facing concave end 107. The concave end 107 can receive the generally spherical surveillance dome 120. As described above, the turret assembly 110 can include the device 112 (shown here as a camera) supported by the gimbal 114. In one embodiment, the gimbal 114 can include a first gimbal support or carriage 122 that carries a second gimbal support or cradle 124. The device 112 can be carried by the second support 124. As described in greater detail below, the gimbal 114 can be configured to move the device 112 about at least two axes relative to the aircraft 100.

In one aspect of the embodiment shown in FIG. 2A, the first support 122 can be operably coupled to a pan actuator 126 (shown schematically) for rotation about a pan rotation axis 128 (as shown by the arrow P). The second support 124 can be coupled to a tilt actuator (not shown) for rotation about a tilt rotation axis 132 (as shown by the arrow T). A pan axis spindle or drive shaft (not shown—described below with reference to FIGS. 3A and 3B) can extend between the pan actuator 126 and the first support 122 to move the first support 122 about the pan axis 128. The motion of the gimbal 114 can be controlled by a computer or other numerical processor or controller (not shown) operably coupled to the gimbal 114. The controller can be configured to receive direct user input and/or programmed instructions. The configuration of the gimbal 114 illustrated in FIG. 2A is often referred to in the surveillance industry as a pan-over-tilt assembly (based on the gimbal's rotation about the pan axis 128 and the tilt axis 132) or a "PTZ" device (based on the pan, tilt, and zoom functionality of the camera 112 carried by the gimbal 114). In other embodiments, the gimbal 114 can have other arrangements and/or include different features.

The device 112 can include an aperture 113 having a line of sight or boresight direction L. In one embodiment, the device 112 can include a video camera configured to capture images formed by radiation in the visible spectrum. For example, the device 112 can include a Sony model FCB-EX780B commercially available from the Sony Corporation of Tokyo, Japan. In other embodiments, the device 112 can be configured to capture images formed by radiation having other wavelengths (e.g., infrared images). For example, the device 112 can include an infrared unit, such as an E6000 infrared camera commercially available from DRS Technologies of Parsippany, N.J. In still further embodiments, the device 112 can include a still camera and/or can be configured to capture still images. The images captured by the device 112 can be stored on board the aircraft 100 and/or transmitted to a remote location (e.g., a ground- or sea-based monitor). In yet other embodiments, the device 112 can have other configurations and/or be configured to capture other types of images or data. Furthermore, the turret assembly 110 can carry one or more additional devices (e.g., an air data sensor, laser pointer, illuminator, designator, range spotter, directive antenna, and/or weapon) in addition to the camera 112.

Returning to an embodiment where the device 112 is a camera, the surveillance dome or housing 120 surrounding the device 112 and the gimbal 114 can be formed from glass, plastic, or another suitable material that provides a desired level of environmental protection. The surveillance dome 120 is generally clear (at least in the particular wavelengths of interest) over the desired field of view. In one particular aspect of the embodiment illustrated in FIG. 2A, for example, the surveillance dome 120 includes one or more windows 121 (two are shown as first and second windows 121a and 121b, respectively) having optical properties (e.g., transmissivity, shape, size, etc.) corresponding at least in part to the optical characteristics of the camera 112. The first window 121a, for example, is generally aligned with the line of sight L of the device 112 and is transparent to the radiation at which the device 112 is sensitive. For example, when the device 112 is sensitive to infrared radiation, the first window 121a can be transparent to infrared radiation. The second window 121b, which is not currently aligned with the device's line of sight L, can be transparent to the same wavelength of radiation as the first window 121a, or the second window 121b can be transparent to a different radiation. The rest of the surveillance dome 120 can be translucent and/or opaque to the selected radiation(s). In other embodiments, the surveillance dome 120 can have a different arrangement and/or can include different features. For example, the surveillance dome 120 can be non-spherical and does not have to completely enclose all the internal components of the turret assembly 110.

One feature of an embodiment of the arrangement described above is that the surveillance dome 120 can include one or more windows 121 that occupy less than the entire surface area of the surveillance dome 120. An advantage of this arrangement is that the amount of selectively transparent material (which can be expensive) can be reduced as compared with other arrangements in which the entire surveillance dome 120 is transparent to the desired radiation. In other embodiments, the surveillance dome 120 can have a different number of windows 121 or, as described below with reference to FIGS. 8A-8C, the surveillance dome can include a strip-shaped slit rather than a window. In still further embodiments, the surveillance dome 120 may not include any windows and the entire dome can be transparent to the desired radiation.

The surveillance dome 120 can be operably coupled to the first support 122 and/or the second support 124 of the gimbal 114 so that the surveillance dome 120 and the device 112 rotatably move as a unit about the pan axis 128 and/or the tilt axis 132. One advantage of the turret assembly 110 illustrated in FIG. 2A is that the turret assembly 110 can rotate about a much wider range of motion than most conventional turret assemblies. For example, the entire turret assembly 110 can generally rotate up to approximately 360 degrees about the pan axis 128 (as shown by the arrow P) and up to approximately 360 degrees about the tilt axis 132 (as shown by the arrow T). One advantage of this feature, as described in greater detail below with reference to FIGS. 2B and 2C, is that rotating the turret assembly 110 to certain "landing positions" before landing or capture of the aircraft 100 can help minimize or otherwise prevent substantial damage to the device 112, the gimbal 114, and/or the surveillance dome 120 during such operations.

Figure 3A:
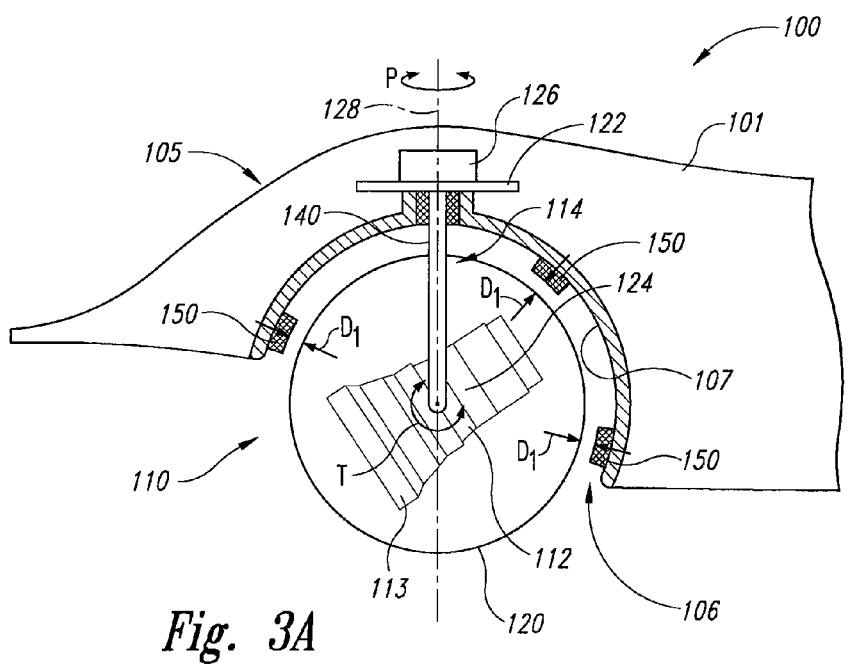
FIG. 3A is a schematic, side cross-sectional view of the turret assembly of FIG. 1 during normal airborne operation.
Figure 3B:
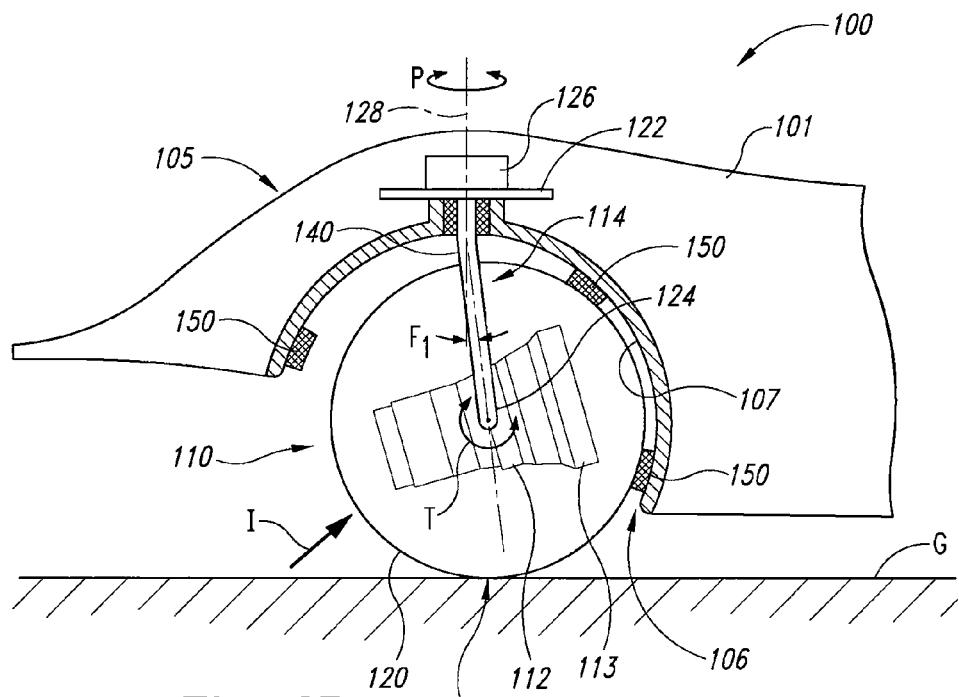
FIG. 3B is a schematic, side cross-sectional view of the turret assembly of FIG. 1 during landing operations.

In one aspect of the embodiment illustrated in FIG. 2A, the device's line of sight L is pointing forward and downward relative to the aircraft 100 to track a target below the aircraft. This configuration is suitable for most airborne surveillance operations but, as described previously, may potentially be unsuitable for belly landings because a number of sensitive portions of the turret assembly 110 (e.g., the front portion of the device 112, the first and second windows 121a and 121b, etc.) are positioned for direct impact with the ground (not shown). Accordingly, to help prevent and/or inhibit damage to the turret assembly 110 during landing or other high-impact operations (a) the turret assembly 110 can be rotatably moved to orient the device 112 and first and second windows 121a and 121b such that sensitive portions of the device and surveillance dome 120 are less likely to be damaged upon impact, and (b) the turret assembly 110 and the aircraft 100 can be structurally arranged such that the turret assembly 110 can initially withstand at least a portion of the landing loads upon impact, and then transfer the remaining forces to corresponding portions of the aircraft 100. By way of example, FIGS. 2B and 2C illustrate two different "landing" orientations or positions for the turret assembly 110 to help prevent or otherwise inhibit damage to the device 112 and the first and second windows 121a and 121b, and FIGS. 3A and 3B illustrate an embodiment of a structural support or force transfer arrangement for the turret assembly 110 to absorb at least a portion of the landing loads and transfer the remaining loads to the aircraft 100. These Figures are discussed in greater detail below.

FIG. 2B, for example, illustrates the turret assembly 110 in a second position relative to the aircraft 100 after the turret assembly has been rotated (a) approximately 90 degrees clockwise or counterclockwise about the pan axis 128, and (b) approximately 90 degrees about the tilt axis 132 such that the line of sight L is pointing upward in a generally vertical direction relative to the aircraft 100. One aspect of the configuration illustrated in FIG. 2B is that the device aperture 113 and other components at a front portion of the device 112, as well as the first and second windows 121a and 121b of the surveillance dome 120, are generally protected from direct impact with the ground and rocks or other debris that can break through the surveillance dome 120 upon impact. Instead, a back or end portion 134 of the device 112 is positioned proximate to the impact zone. In many cases, the end portion 134 of the device 112 is more sturdy or resilient than the sensitive components at the front portion of the device (i.e., the camera lens, etc.). Accordingly, the end portion 134 is more likely to survive a high-impact landing operation involving direct impact of the turret assembly 110 with the ground.

Another aspect of the embodiment illustrated in FIG. 2B is that turret assembly 110 is positioned such that the tilt axis 132 is oriented generally parallel with the aircraft's direction of travel (as shown by the arrow A). An advantage of this arrangement is that the turret assembly 110 will not be "back-driven" about the tilt axis 132 upon impact with the ground (not shown). More specifically, when the turret assembly 110 is in a typical operational position (such as the orientation of the turret assembly 110 in FIG. 2A), the turret assembly 110 has a tendency to "roll" about the tilt axis 132 as the aircraft moves or skids across the ground. This rolling motion can put excessive strain on the tilt actuator (not shown) and, in many cases, can require an anti-rotation mechanism configured to withstand such rotational loads. Orienting the turret assembly 110 as shown in FIG. 2B, however, can eliminate the need for such an anti-rotation mechanism and typically results in a simpler (and in some cases, lighter) gimbal mechanism.

FIG. 2C illustrates the turret assembly 110 in a third position relative to the aircraft 100 in which the turret assembly has been rotated approximately 180 degrees clockwise or counterclockwise about the pan axis 128 from the first position such that the line of sight L is pointing in a generally opposite direction as the aircraft's direction of travel (as shown by the arrow A). Furthermore, the line of sight L is pointed at least partially upward (i.e., above a horizon relative to the aircraft 100). As with the configuration described above with reference to FIG. 2B, the back portion 134 of the device 112 is positioned proximate to the landing's impact zone, while the front portion of the device 112 and the first and second windows 121a and 121b are in a "landing" position and generally protected from rocks or other debris that can break through the surveillance dome 120 upon impact.

In contrast with the arrangement shown in FIG. 2B, the turret assembly 110 in FIG. 2C is oriented such that the tilt axis 132 is generally transverse to the aircraft's direction of travel (the arrow A). Accordingly, an anti-rotation mechanism (not shown) will generally be necessary to prevent or otherwise inhibit the rolling motion of the turret assembly 110 described previously. In other embodiments, other suitable mechanisms can be used to limit undesired rotation of the turret assembly 110 during operation. Although three particular turret assembly orientations are illustrated in FIGS. 2A-2C, it will be appreciated that the turret assembly 110 can be oriented or moved to a variety of different operational positions relative to the aircraft 100, and a number of these different positions can have many of the same advantages as those described herein.

As mentioned previously, FIGS. 3A and 3B illustrate an embodiment of a structural support system for the turret assembly 110 to absorb and/or transfer the landing loads from the turret assembly 110 to other portions of the aircraft 100. Each of these Figures has been greatly simplified to illustrate only particular aspects of the turret assembly 110 and, accordingly, a number of the features described above with reference to FIGS. 2A-2C are not shown in FIGS. 3A and 3B.

FIG. 3A, for example, is a schematic, side cross-sectional view of the turret assembly 110 during normal airborne operation (e.g., the first position described above with reference to FIG. 2A). In one aspect of the embodiment illustrated in FIG. 3A, a turret support assembly 140 (shown schematically) is operably coupled between the pan actuator 126 and the first support 122. As used herein, the terms "turret support assembly" and "support assembly" refer to one or more of the components of the aircraft structure, gimbal system, and/or turret that support and/or control the operation of the turret assembly 110. Examples of such components include, but are not limited to, a spindle or drive shaft, an aircraft bulkhead or bearing mount, one or more elastomeric mounts or elements, bearings, and other related components. For purposes of illustration, the schematic representation of the support assembly 140 in FIG. 3A extends along an axis generally parallel with the pan axis 128 and is configured to provide support to the gimbal 114 and the device 112. In the illustrated embodiment, the support assembly 140 can also include a pan axis spindle or drive shaft (not shown) configured to move the gimbal 114 about the pan axis 128. Although the support assembly 140 is generally configured to withstand substantial forces in the vertical or upward direction (i.e., generally parallel with the pan axis 128), the support assembly 140 is not configured to withstand any excessive forces in the shear direction (i.e., forces exerted on the support assembly 140 at an angle relative to the pan axis 128). In some conventional systems, the support assembly 140 can be strengthened to withstand additional forces, but such modifications are generally undesirable because they can significantly increase the weight and complexity of the gimbal system.

Another aspect of the embodiment illustrated in FIG. 3A is that a plurality of turret engagement portions or support structures 150 are carried by the fuselage 101 proximate to the surveillance dome 120. The surveillance dome 120 is spaced apart from each engagement portion 150 by a distance $D_1$. The distances $D_1$ are not identical (although they might be). The distances $D_1$ can be non-identical to accommodate non-spherical domes, variations in fuselage shape, differences in expected bending geometries upon impact, and/or other reasons. As described in greater detail below with reference to FIG. 3B, the engagement portions 150 are hard points or mechanical stops positioned to limit movement or compression of the turret assembly 110 upon impact with the ground or another structure. The engagement portions 150 can include individual pads, large portions or areas, small points or strips, or other suitable arrangements. The engagement portions 150 can be relatively slippery to help the surveillance dome 120 nest into a desired geometric pattern of engagement portions 150 during impact. Alternatively, the engagement portions 150 can have relatively high friction portions or mechanical engagement features to help prevent the surveillance dome 120 from moving during impact. In several embodiments, the engagement portions 150 may be aligned with and engage or mate with specific structural features of the surveillance dome 120 prior to landing or capture operations. In other embodiments, however, the engagement portions 150 may engage a wide area over the surface of the dome 120 to reduce contact pressure, and thus work properly regardless of the orientation of the surveillance dome 120. The engagement portions 150 can be comprised of carbon, Kevlar®, composite materials, aluminum, rubber, urethane, and/or other suitable materials.

The distances $D_1$ are specifically selected such that the surveillance dome 120 and corresponding engagement portions 150 are neither too close nor too far away from each other. For example, if the engagement portions 150 are too far away from the surveillance dome 120, the turret assembly 110 can excessively flex or otherwise move before contacting the engagement portions 150 and a number of the turret assembly's components can be damaged before movement of the turret assembly 110 is inhibited by the engagement portions 150. Likewise, if the engagement portions 150 are too close to the surveillance dome 120, the landing forces may not be sufficiently transferred from the turret assembly 110 to the engagement portions 150 and/or the aircraft 100. Moreover, if the engagement portions 150 are too close to the surveillance dome 120, the engagement portions 150 may rub during normal operation and potentially impede proper operation of the turret assembly 110. Furthermore, the distances $D_1$ should be specifically selected such that contact between the surveillance dome 120 and the corresponding engagement portions 150 does not occur during normal operation or, if such contact occurs, does not cause one or both of the respective components to break.

FIG. 3B is a schematic, side cross-sectional view of the turret assembly 110 during high-impact landing operations. More specifically, the aircraft 100 is performing a belly landing and the turret assembly 110 impacts the ground G at an impact point 160. The force of impact (as shown by the arrow I) causes the turret assembly 110 to move both upward and backward relative to the aircraft 100 and brings the surveillance dome 120 into contact with one or more engagement portions 150. As discussed previously, such an impact between the ground G and a conventional turret assembly would likely result in substantial damage or complete destruction of the turret assembly. In contrast with conventional assemblies, however, the engagement portions 150 engage the turret assembly 110 after impact with the ground G and restrict or otherwise limit movement of the turret assembly 110 toward the concave end 107 of the aircraft 100. The excess impact forces are transferred from the turret assembly 110 to other portions of the aircraft 100 via the engagement portions 150.

In one particular aspect of this embodiment, the support assembly 140 is configured to elastically deflect far enough during the landing impact to allow the turret assembly 110 to make contact with one or more engagement portions 150. In the illustrated embodiment, for example, the support assembly 140 flexes an angle $F_1$ relative to the support assembly's pre-impact position before the engagement portions 150 contact the surveillance dome 120 and limit the upward and backward movement of the turret assembly 110. This flexing could be an inherent elasticity in the component(s) that make up the support assembly 140, or elastomeric elements (e.g., vibration isolators), from which the turret assembly 110 is suspended. For example, elastomeric mounts designed as vibration isolators could have the flexibility needed to allow the turret assembly 110 to contact the engagement portions 150. In one embodiment, for example, elastomeric mounts could be positioned such that the elasticity is configured to provide both vibration isolation during normal flight operation and adequate excursion to allow contact with the engagement portions 150 without ripping or otherwise damaging the elastomeric mounts. The amount of flexing the support assembly 140 can withstand is based on, among other things, the force of impact, the types of components that are part of the support assembly 140, the materials of which the components are composed, the dominant flexural component(s) of the support assembly 140, and/or the amount (if any) of reinforcement about the support assembly 140. As discussed above, the distances $D_1$ (FIG. 3A) between the turret assembly 110 and corresponding engagement portions 150 are specifically chosen such that the components of the support assembly 140 do not bend or flex past their respective stress limits during impact. In several embodiments, the pan axis spindle (not shown) and/or other components of the gimbal system (e.g., gear teeth, gears, etc.) can be disengaged or placed in a "neutral" position prior to landing to further help prevent damage to these delicate components during high-impact operations. In other embodiments, the support assembly 140 itself can be strengthened or reinforced to further increase the amount of force the turret assembly 110 can withstand during high-impact operations or landing. Such reinforcements, however, must generally be reconciled with the aircraft's operational weight limitations and should not be too excessive or cause excessive friction so as to interfere with the spindle's precision and/or responsiveness during surveillance operations.

Figure 3C:
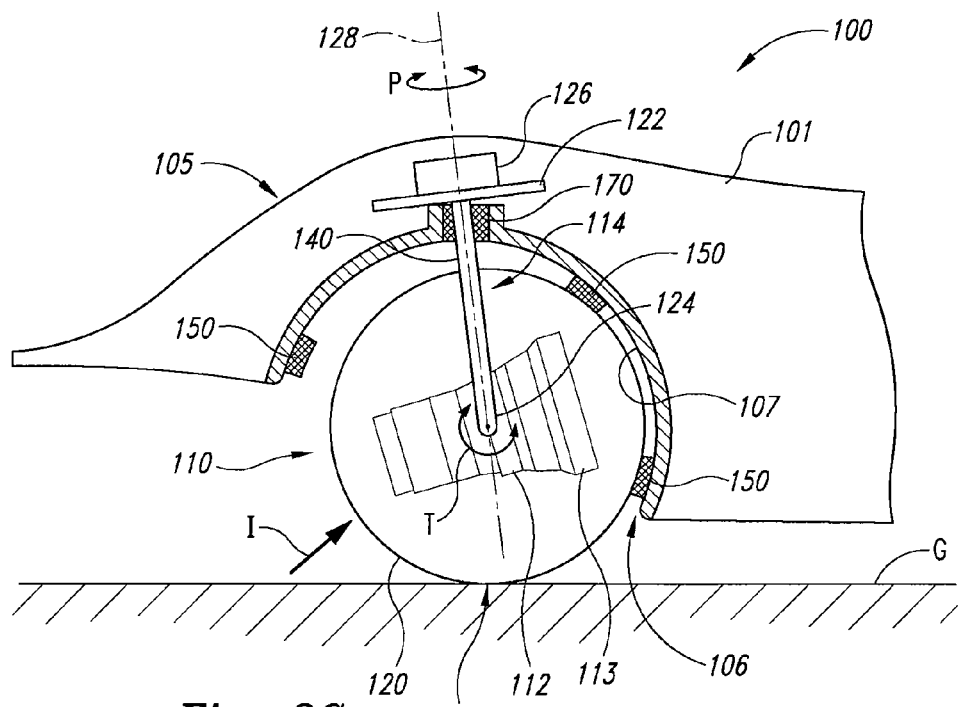
FIG. 3C is a schematic, side cross-sectional view of the turret assembly of FIG. 1 during landing operations in accordance with another embodiment of the disclosure.

FIG. 3C is a schematic, side cross-sectional view of the turret assembly 110 during high-impact landing operations in accordance with another embodiment of the disclosure. In this embodiment, a frame 170 (e.g., an elastomeric mount) supporting at least a portion of the support assembly 140 flexes in lieu of the support assembly 140 itself until the turret assembly 110 contacts the corresponding engagement portions 150. One advantage of this arrangement is that the frame 170 flexes rather than the various components of the support assembly 140, which can further help prevent damage to these components during landing operations.

One feature of several embodiments of the turret assembly 110 described above with reference to FIGS. 1-3C is that the structural support system can allow the turret assembly 110 to survive belly landings or other high-impact operations with significantly higher probability than conventional turret assemblies. Because the engagement portions 150 limit excessive movement of the turret assembly 110 during impact and allow the support assembly 140 and other components of the turret to flex within an appropriate range, the excessive landing forces can be transferred to other portions of the aircraft 100 without excessively damaging or destroying the turret assembly 110 and its delicate components. For example, in many cases the support assembly 140 can simply "spring" back to its original or pre-impact position after a high-impact landing, rather than breaking or suffering substantial damage. One advantage of this feature is that aircraft operations can be significantly less expensive because the aircraft 100 and its surveillance payload can be used for multiple missions without requiring costly repairs, maintenance, and/or replacement.

Embodiments of the turret assembly 110 described above are further expected to allow operators to create new and improved operational procedures and/or concepts for the aircraft 100. As discussed previously, most operators generally use belly landings only as an emergency procedure because of the potential for damage. In contrast, embodiments of the turret assembly 110 described above provide operators the ability to use belly landings as a normal mode of operation. This is expected to significantly expand the aircraft's operational envelope and allow the aircraft 100 to operate in a greater variety of environments and/or conditions as compared with aircraft including conventional turret assemblies.

Figure 4A:
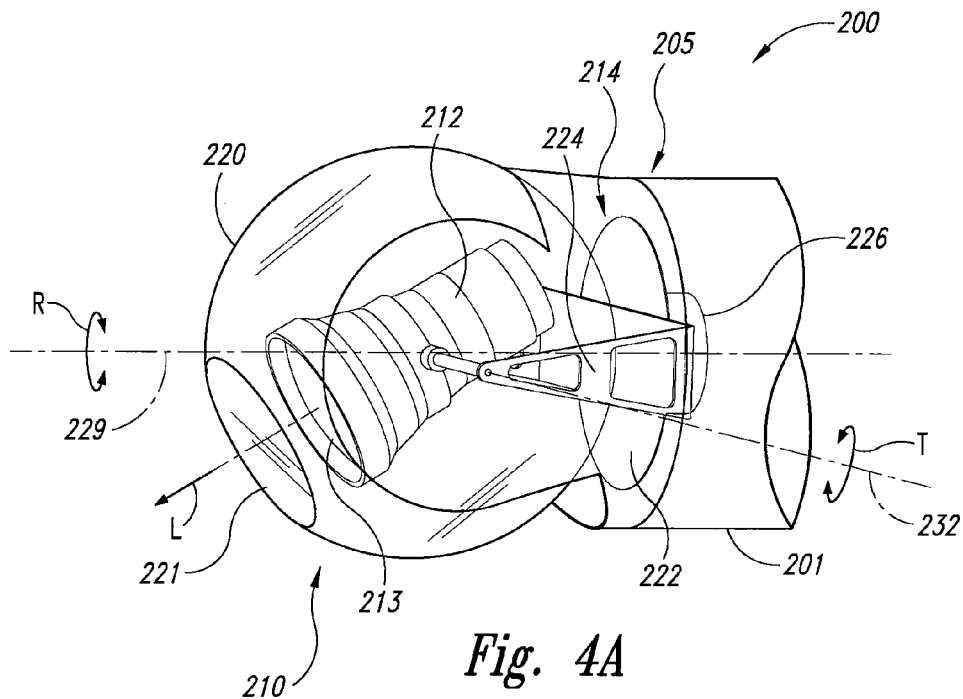
FIGS. 4A and 4B are partially schematic, isometric views of a portion of an unmanned aircraft including a turret assembly rotatably moved to two different positions in accordance with another embodiment of the disclosure.
Figure 4B:
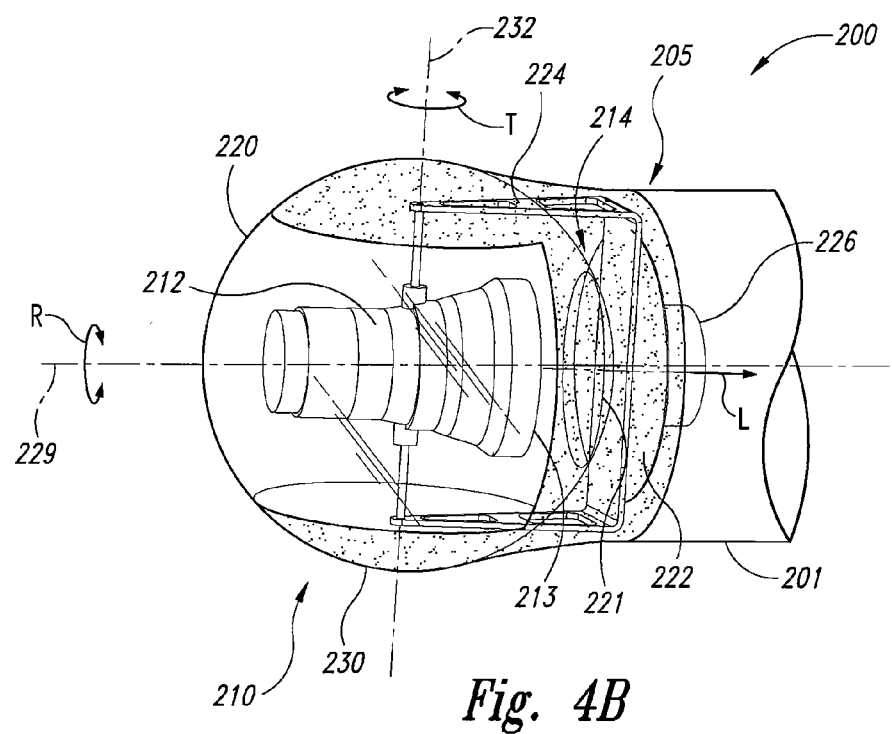
Figure 5A:
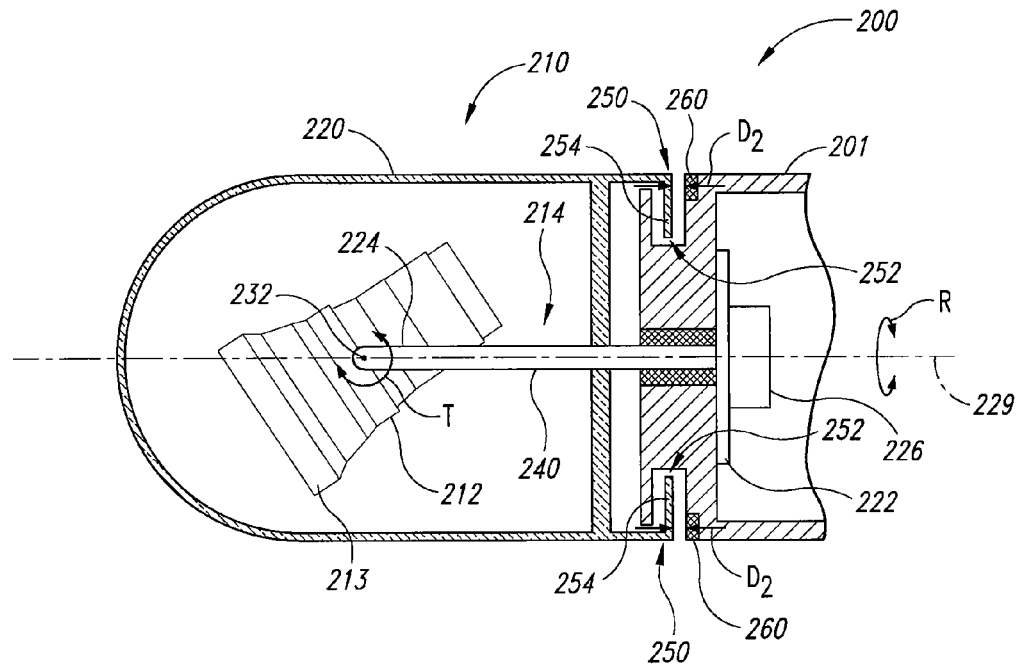
FIG. 5A is a schematic, side cross-sectional view of the turret assembly of FIG. 4A during normal airborne operation.
Figure 5B:
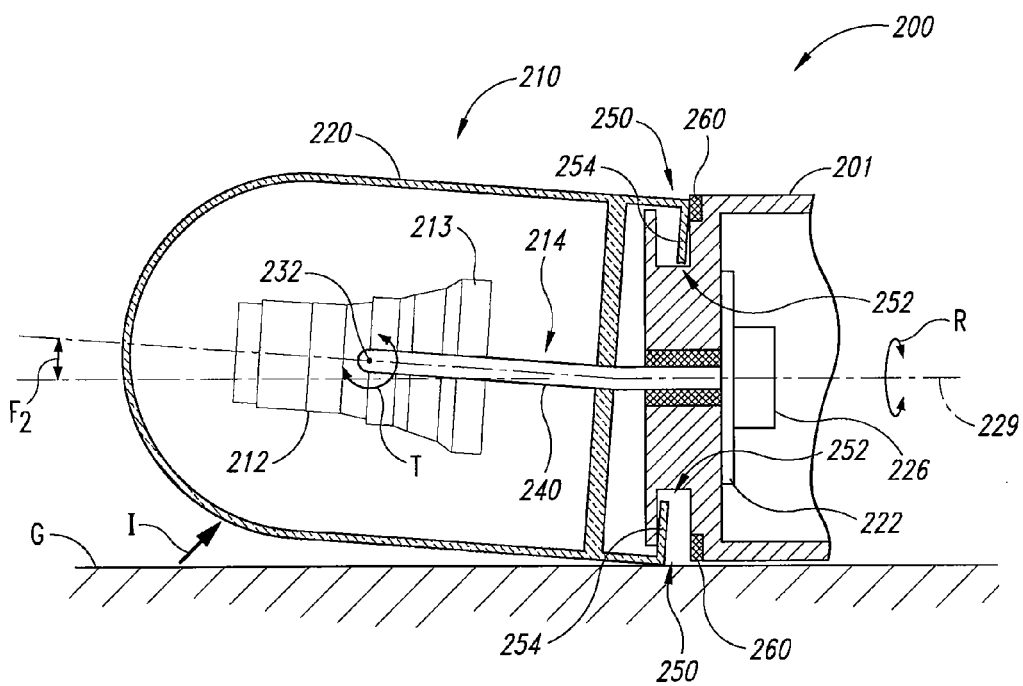
FIG. 5B is a schematic, side cross-sectional view of the turret assembly of FIG. 5A during landing operations.

FIGS. 4A-5B illustrate another embodiment of a turret assembly for an unmanned aircraft and methods for operating such a turret assembly. More specifically, FIGS. 4A and 4B are partially schematic, isometric views of a portion of an unmanned aircraft 200 including a turret assembly 210 rotatably moved to two different operational positions, and FIGS. 5A and 5B illustrate an embodiment of a structural support system for the turret assembly 210 to absorb and/or transfer landing loads from the turret assembly 210 to other portions of the aircraft 200.

Referring first to FIG. 4A, the turret assembly 210 is in a first position (e.g., a normal airborne operational position) relative to the aircraft 200. The aircraft 200 can be generally similar to the aircraft 100 described above with respect to FIGS. 1 and 2A, except that the aircraft 200 includes the turret assembly 210 having a different configuration than the turret assembly 110. More specifically, rather than the pan-over-tilt turret assembly 110 described above that is generally positioned below the nose portion 105 of the aircraft 100, the aircraft 200 includes a so-called "roll-over-tilt" turret assembly 210 that projects from a nose portion 205 of the aircraft 200 along a roll or rotation axis 229 (as shown by the arrow R) generally parallel with a longitudinal axis (not shown) extending through a fuselage 201 of the aircraft 200. Although the turret assembly 210 operates in the "roll" direction instead of the "pan" direction, the turret assembly 210 can offer generally similar surveillance capabilities as the pan-over-tilt configuration described above. Additionally, the potential for damage to the turret assembly 210 during a belly landing is reduced as compared with the turret assembly 110 described above because the turret assembly 210 is mounted generally parallel with the nose portion 205 of the aircraft 200 rather than below the nose portion of the aircraft as is generally the case with the pan-over-tilt turret assembly 110.

The turret assembly 210 can include several features generally similar to the turret assembly 110 described above with reference to FIGS. 1-2C. For example, the turret assembly 210 includes a device 212 carried by a gimbal system 214. In embodiments where the device 212 is a camera or other imaging payload, the device 212 includes an aperture 213 having a line of sight L. The device 212, for example, can include a video camera or other camera similar to those described above with reference to FIG. 2A. In other embodiments, the turret assembly 210 can include other suitable payloads.

The gimbal 214 is configured to move the device 212 relative to the aircraft 200 to acquire and/or track a target. The gimbal 214, for example, can include a first gimbal support or carriage 222 that carries a second support or cradle 224. The device 212 can be carried by the second gimbal support 224. In one aspect of the embodiment shown in FIG. 4A, the first support 222 can be operably coupled to a roll actuator 226 (shown schematically) for rotation about the roll axis 229 (as shown by the arrow R). The second support 224 can be coupled to a tilt actuator (not shown) for rotation about a tilt axis 232 (as shown by the arrow T). A roll axis spindle or drive shaft (not shown—described below with reference to FIGS. 5A and 5B) can extend between the roll actuator 226 and the first support 222 to move the first support 222 about the roll axis 229. In other embodiments, the gimbal 214 can have other arrangements and/or include different features.

The device 212 and the gimbal 214 can be positioned behind a surveillance dome or housing 220. The surveillance dome 220 can be generally similar to the surveillance dome 120 described above with reference to FIG. 2A. For example, the surveillance dome 220 can be formed from glass, plastic, or another suitable material that provides a desired level of environmental protection. In addition, the surveillance dome 220 can have one or more windows 221 (only one is shown) having optical properties corresponding at least in part to the optical properties of the camera 212 and at least generally aligned with the device's line of sight L. The rest of the surveillance dome 220 can be translucent and/or opaque to the selected radiation(s). In other embodiments, the surveillance dome 220 can have a different arrangement and/or can include different features.

The surveillance dome 220 can be operably coupled to the first support 222 and the second support 224 to rotatably move the surveillance dome 220 along with the device 212 as a unit about the roll axis 229 and the tilt axis 232. For example, an outer stage or portion of the turret assembly 210 can rotate up to approximately 360 degrees about the roll axis 229 (as shown by the arrow R), and an inner stage or portion of the turret assembly 210 can rotate up to approximately 360 degrees about the tilt axis 232 (as shown by the arrow T). One advantage of this feature, as described in greater detail below with reference to FIG. 4B, is that rotating the turret assembly 210 to certain "landing positions" before landing or capture of the aircraft 200 can help minimize or otherwise prevent damage to the device 212, the gimbal 214, and/or the surveillance dome 220 during such operations.

As mentioned previously, one aspect of the embodiment illustrated in FIG. 4A is that the camera's line of sight L is pointing forward and downward relative to the aircraft 200 to track a target below the aircraft. This configuration is suitable for most airborne surveillance operations but is generally unsuitable for belly landings because many of the sensitive and delicate components of the turret assembly 210 are positioned for direct impact with the ground (not shown). Accordingly, as with the turret assembly 110 described above with reference to FIGS. 1-2C, the turret assembly 210 can be rotatably moved to different landing positions or orientations to help prevent and/or inhibit such damage. FIG. 4B, for example, illustrates the turret assembly 210 in a second position relative to the aircraft 200 after (a) the outer stage of the turret assembly 210 has been rotated approximately 90 degrees clockwise or counterclockwise about the roll axis 229, and (b) the inner stage of the turret assembly 210 has been rotated approximately 180 degrees clockwise or counterclockwise about the tilt axis 232 such that the line of sight L is pointing substantially away from the aircraft's direction of travel (indicated by the arrow A).

One particular aspect of the embodiment illustrated in FIG. 4B is that after rotating the turret assembly 210 approximately 90 degrees clockwise or counterclockwise about the roll axis 229, a protective portion 230 of the surveillance dome 220 is positioned for direct impact with the ground (not shown). The protective portion 230 is not illustrated in FIG. 4A to avoid obscuring other aspects of the turret assembly 210. The protective portion 230 is configured as a "skid pad" to help protect the delicate portions of the surveillance dome 220 during direct impact with the ground and from rocks or other debris that can impact the surveillance dome. In the illustrated embodiment, the surveillance dome 220 includes two protective portions 230 positioned diametrically opposite one another on the surveillance dome 220. In other embodiments, however, the surveillance dome 220 can include a different number of protective portions 230 and/or the protective portions 230 can have a different arrangement relative to each other. The protective portions 230 can be formed from one or more layers of hardened, aerodynamic material with one or more layers of softer, compressible material underneath the hardened outer layers. In this way, the protective portions 230 can withstand the direct impact force, as well as absorbing at least a portion of the force. In other embodiments, the protective portions 230 can be formed from one or more different materials. In still other embodiments, the turret assembly 210 can include one or more additional protective portions 230. After landing operations, the one or more protective portions 230 can be easily repaired and/or replaced (if necessary).

Another aspect of the embodiment illustrated in FIG. 4B is that the device 212 and corresponding window 221 of the surveillance dome 220 are pointed away from the potential impact zone. As discussed previously, one advantage of orienting the turret assembly 210 in such a way before a high-impact landing or capture operation is that a front portion of the device 212 and the corresponding window 221 are generally protected from rocks or other debris that can break through the surveillance dome 220 upon impact.

Still another aspect of the arrangement shown in FIG. 4B is that the turret assembly 210 is oriented such that the tilt axis 232 is generally transverse to the aircraft's direction of travel (indicated by the arrow A). An advantage of this arrangement (and similar to the advantages discussed above with reference to FIG. 2B) is that the turret assembly 210 will not be "back-driven" about the tilt axis 232 upon impact with the ground and the tilt actuator (not shown) will not be subjected to excessive rotational loads during landing. Thus, orienting the turret assembly 210 as shown in FIG. 4B for landing or capture operations can help mitigate the need for a bulky anti-rotation mechanism and generally results in a simpler (and in some cases, lighter) gimbal system.

Although only two particular turret assembly orientations are illustrated in FIGS. 4A and 4B, it will be appreciated that the turret assembly 210 can be oriented in a number of different positions relative to the aircraft 200, and many of these different positions can have a number of the same advantages as those described herein. For example, the turret assembly 210 can be rotated to a number of different "landing positions" in which the device's line of sight L is pointed above the horizon relative to the aircraft 200 and away from the point of impact before landing to help minimize or otherwise prevent damage to the device 212, the gimbal 214, and/or the surveillance dome 220.

As mentioned above, FIGS. 5A and 5B illustrate an embodiment of a structural support system for the turret assembly 210 that absorbs and/or transfers landing loads from the turret assembly 210 to other portions of the aircraft 200. Each of these Figures has been greatly simplified to illustrate only particular aspects of the turret assembly 210 and, accordingly, a number of the features described above with reference to FIGS. 4A and 4B are not shown in FIGS. 5A and 5B.

FIG. 5A, for example, is a schematic, side cross-sectional view of the turret assembly 210 during normal airborne operation (e.g., the first position described above with reference to FIG. 4A). In one aspect of the embodiment illustrated in FIG. 5A, a turret support assembly 240 (shown schematically) is operably coupled between the roll actuator 226 and the first support 222. For purposes of illustration, the schematic representation of the support assembly 240 in FIG. 5A extends along an axis generally parallel with the roll axis 229 and is configured to provide support to the gimbal 214 and the device 212. The support assembly 240 can also include a roll axis spindle or drive shaft (not shown) configured to move the gimbal 214 about the roll axis 229. The support assembly 240 is generally configured to withstand a certain level of landing forces in a direction generally parallel with the roll axis 229, but the support assembly 240 is generally not configured to withstand any forces in the shear direction (i.e., forces exerted in an upward or vertical direction such that the forces are exerted at an angle relative to the roll axis 229). In some conventional systems, the support assembly 240 can be strengthened to withstand additional forces, but such modifications are generally undesirable because they can significantly increase the weight and complexity of the turret assembly 210. Such reinforcements, however, must generally be reconciled with the aircraft's operational weight limitations and should not be so bulky or cause excessive friction so as to interfere with the spindle's precision and/or responsiveness during operation.

One aspect of the embodiment illustrated in FIG. 5A is that the aircraft 200 includes a labyrinth seal 250 between the turret assembly 210 and the fuselage 201 of the aircraft 200. Labyrinth seals generally include one or more non-contacting rotary elements and one or more corresponding stationary elements to provide a restricted flow path through the seal and utilize centrifugal force and gravity to prevent intrusion of particulates and/or contaminants into the components on one or both sides of the seal. In the illustrated embodiment, for example, the labyrinth seal 250 includes one or more channels 252 (only one is shown) configured to receive corresponding projections or fingers 254. The projection 254 can rotatably move about the channel 252 without contacting the interior sidewalls of the channel 252 during normal operation. In this way, the labyrinth seal 250 can provide environmental protection for the various components of the turret assembly 210 and the aircraft 200 and help prevent debris or other particulates from contaminating the various components of these systems. In addition, because the projection 254 does not contact the channel 252 during normal operation, the labyrinth seal 250 is expected to require little or no maintenance. In other embodiments, the labyrinth seal 250 can have a different arrangement and/or include different features. In still other embodiments, a different type of seal or joint can be used between the turret assembly 210 and the aircraft 200.

Similar to the structural support system described above with reference to FIGS. 3A and 3B, another particular aspect of the embodiment illustrated in FIG. 5A is that a plurality of turret engagement portions or support structures 260 (two are shown in the illustrated embodiment) are carried by the fuselage 201 proximate to the surveillance dome 220. The engagement portions 260 are hard points or mechanical stops positioned to limit movement or compression of the turret assembly 210 toward the fuselage 201 after impact with the ground or another external structure. In the illustrated embodiment, for example, the engagement portions 260 are spaced apart from the projection 254 by a variable distance $D_2$, which is specifically selected such that the projection 254 and corresponding engagement portions 260 are neither too close nor too far away from each other. The engagement portions 260 can be comprised of materials similar to the materials used to form the engagement portions 150 described above with reference to FIG. 3A (e.g., carbon, Kevlar®, composite materials, aluminum, rubber, and/or other suitable materials).

FIG. 5B is a schematic, side cross-sectional view of the turret assembly 210 during landing operations. More specifically, the aircraft 200 is performing a belly landing and the turret assembly 210 impacts the ground G at an impact point 260. The force of impact (as shown by the arrow I) causes the turret assembly 210 to move both upward and backward relative to the aircraft 200 and brings the turret assembly 210 into contact with one or more engagement portions 260. As mentioned previously, in conventional assemblies, such an impact between the ground G and the turret assembly would likely result in substantial damage or complete destruction of the turret assembly. In the illustrated embodiment, however, after impact with the ground G, the turret assembly 210 (and more specifically, the projection 254) moves into contact with one or more engagement portions 260 that restrict or otherwise limit the upward and/or backward movement of the turret assembly 210 relative to the aircraft 200. The impact forces can then be transferred from the turret assembly 210 to other portions of the aircraft 200 via the one or more engagement portions 260.

In one particular aspect of this embodiment, the support assembly 240 is configured to elastically deflect far enough during a landing impact to allow the projection 254 to make contact with one or more engagement portions 260. In the illustrated embodiment, for example, the support assembly 240 flexes an angle $F_2$ relative to the support assembly's pre-impact position before the engagement portions 260 contact and limit the upward and backward movement of the turret assembly 210. The amount of flexing the support assembly 240 can withstand is based on, among other things, the force of impact, the types of components that are part of the support assembly, the materials of which the components are composed, the dominant flexural component(s) of the support assembly 140, and/or the amount (if any) of reinforcement about the support assembly 240. The distance $D_2$ (FIG. 5A) between the projection 254 and the one or more engagement portions 260 is specifically chosen such that the components of the support assembly 240 do not bend or flex past their respective designed stress limits during impact.

FIGS. 6-8C illustrate several additional embodiments of roll-over-tilt turret assemblies for unmanned aircraft and methods for operating such turret assemblies. In each of FIGS. 6-8C, several of the features may be the same as those discussed above in connection with the turret assembly 210 described above with reference to FIGS. 4A-5B. Accordingly, like reference numbers refer to like components in FIGS. 4A-5B and FIGS. 6-8C.

Figure 6:
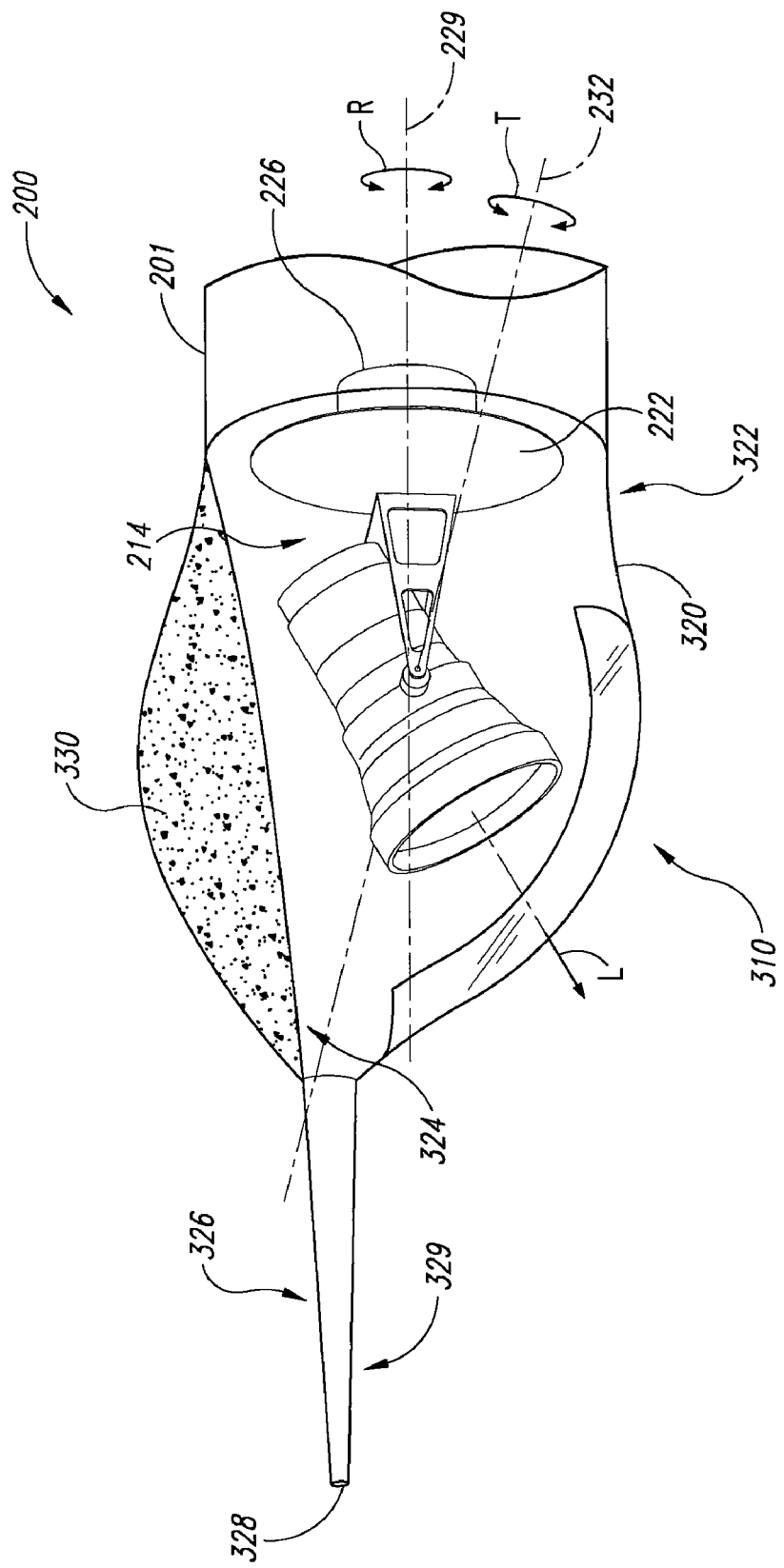
FIG. 6 is a partially schematic, isometric view of a roll-over-tilt turret assembly configured in accordance with another embodiment of the disclosure.

FIG. 6, for example, is a partially schematic, isometric view of a roll-over-tilt turret assembly 310 configured in accordance with another embodiment of the disclosure. The turret assembly 310 illustrated in FIG. 6 is in a typical airborne operational position relative to the aircraft 200. The turret assembly 310 differs from the turret assembly 210 described above in that the turret assembly 310 includes a surveillance dome 320 and one or more protective portions 330 (only one is shown) having different configurations than the surveillance dome 220 and the protective portions 230 of the turret assembly 210.

The surveillance dome 320, for example, includes a generally spherical lower portion 322 and a projecting portion 326 extending from an upper portion 324 of the surveillance dome 320. The projecting portion 326 extends away from the aircraft 200 in a direction generally parallel with the roll axis 229. The projecting portion 326 can include, for example, a pitot tube 328 and a rope deflector 329. In other embodiments, the projecting portion 326 can include different features and/or the surveillance dome 320 can have a different arrangement.

The turret assembly 310 further includes the protective portion 330 configured to shield or otherwise protect the turret assembly 310 from direct impact with the ground (not shown) during landing or high-impact operations. The protective portion 330 is configured as a "skid pad" to help protect the delicate portions of a surveillance dome 320 during direct impact with the ground and from rocks or other debris that can impact the surveillance dome 320. In the illustrated embodiment, the surveillance dome 320 includes a single protective portion 330 covering all or a substantial portion of the upper portion 324 of the surveillance dome 320. In other embodiments, however, the surveillance dome 320 can include a different number of protective portions 330 and/or the protective portion 330 can have a different arrangement relative to the surveillance dome 320. The protective portion 330 can be formed from material generally similar to the materials used to form the protective portion 230 described above. In other embodiments, however, the protective portion 330 can be formed from one or more different materials.

Before landing or high-impact operations, the turret assembly 310 can be positioned in one or more "landing positions" to protect the sensitive components of the device 212 and the surveillance dome 320. The turret assembly 310, for example, is configured to rotate approximately 180 degrees about the roll axis 229 (as shown by the arrow R) to orient the protective portion 330 for direct impact with the ground (not shown) and position the camera 212 and sensitive portions of the surveillance dome 320 away from the impact zone. The protective portion 330 is accordingly positioned to absorb at least a portion of the landing forces, and the turret assembly 310 is configured to transfer the remaining landing forces to the aircraft 200 as described above with reference to FIGS. 5A and 5B. The turret assembly 310, for example, can include the labyrinth seal 250 (not shown—described in detail above with reference to FIG. 5B). In other embodiments, however, the turret assembly 310 can include another type of structural support arrangement configured to transfer the landing loads from the turret assembly 310 to other portions of the aircraft 200.

Figure 7A:
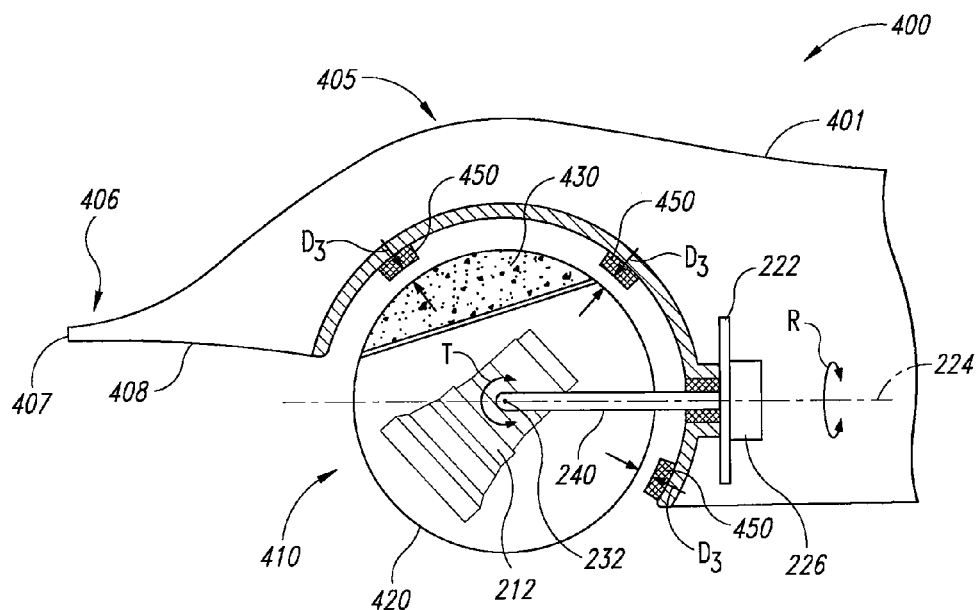
FIG. 7A is a schematic illustration of a roll-over-tilt turret assembly configured in accordance with still another embodiment of the disclosure during normal airborne operation.
Figure 7B:
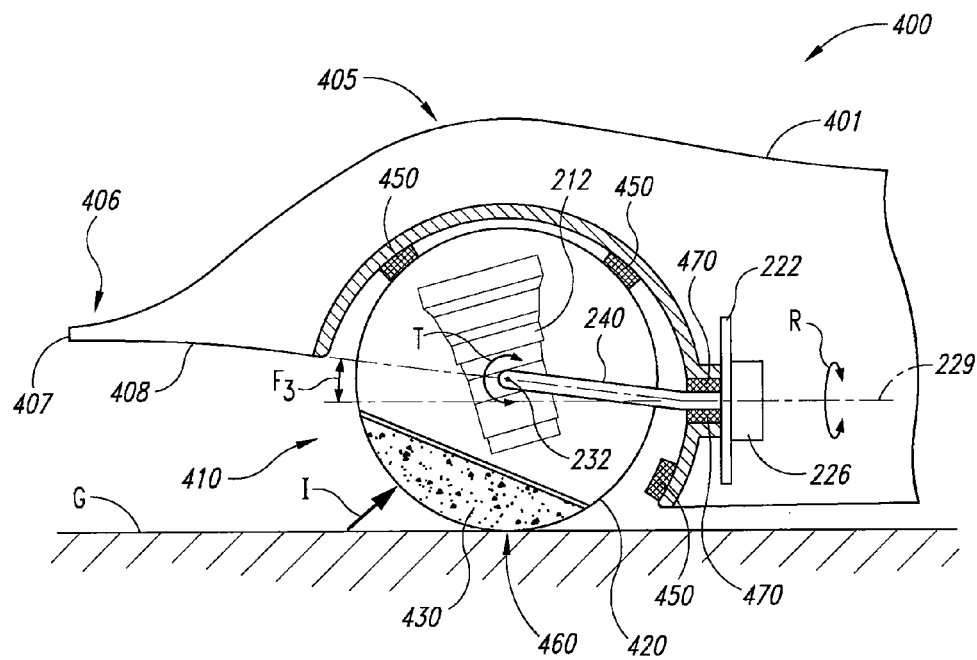
FIG. 7B is a schematic illustration of the turret assembly of FIG. 7A during landing operations.

FIGS. 7A and 7B illustrate yet another embodiment of a structural support system for a roll-over-tilt turret assembly 410 carried by an aircraft 400 to absorb and/or transfer the landing loads from the turret assembly 410 to other portions of the aircraft 400. FIGS. 7A and 7B have been greatly simplified to only illustrate particular aspects of the turret assembly 410.

FIG. 7A, for example, is a schematic, side cross-sectional view of the turret assembly 410 in a normal airborne operational position relative to the aircraft 400. The aircraft 400 can be generally similar to the aircraft 200 described above with respect to FIGS. 4A-5B. For example, the aircraft 400 includes a fuselage 401 and a nose portion 405 carrying the turret assembly 410. The nose portion 405 further includes a projecting portion 406 extending away from the aircraft 400 in a direction generally parallel with the roll axis 229. The projecting portion 406 can include, for example, a pitot tube 407 and a rope deflector 408. In other embodiments, the projecting portion 406 can include different features and/or have a different arrangement.

The turret assembly 410 can include several features generally similar to the turret assemblies 110/210/310 described above. For example, the turret assembly 410 includes the device 212 (shown schematically) carried by a suitable gimbal system (not shown). In other embodiments, the turret assembly 410 can include other suitable imaging or surveillance devices. The gimbal can include the support assembly 240 operably coupled between one or more supports of the gimbal and the roll actuator 226.

In one aspect of the embodiment shown in FIG. 7A, the device 212 and gimbal system (not shown) can be positioned behind a surveillance dome or housing 420. The surveillance dome 420 can be formed from materials similar to those used to form the surveillance dome 220 described above, but the surveillance dome 420 has a different configuration than the dome 220. For example, the surveillance dome 420 includes a protective portion or "skid pad" 430 configured to shield or otherwise protect the turret assembly 410 from direct impact with the ground (not shown) during landing or high-impact operations, as described in greater detail below with reference to FIG. 7B. In the illustrated embodiment, the surveillance dome 420 includes a single protective portion 430 covering all or a substantial portion of an upper area 424 of the surveillance dome 420 (i.e., a "helmet" on the surveillance dome 420). In other embodiments, however, the surveillance dome 420 can include a different number of protective portions 430 and/or the protective portion 430 can have a different arrangement on the surveillance dome 420. The protective portion 430 can be formed from materials similar to those used in the protective portions 230 and 330 described previously.

Another aspect of the embodiment illustrated in FIG. 7A is that a plurality of turret engagement portions or support structures 450 are carried by the nose portion 405 of the fuselage 401 proximate to the surveillance dome 420. The surveillance dome 420 is spaced apart from each engagement portion 450 by a variable distance $D_3$. The distance $D_3$ is specifically selected such that the surveillance dome 420 and corresponding engagement portions 450 are neither too close nor too far away from each other. The distances $D_3$ are not identical (although they might be). Furthermore, the distances $D_3$ can be non-identical to accommodate variations in the shape and/or size of the surveillance dome 420, variations in fuselage shape, differences in expected bending geometries upon impact, and/or other reasons. The engagement portions 450 are hard points or mechanical stops positioned to inhibit movement or compression of the turret assembly 410 after impact with the ground or another structure in a manner generally similar to that described above with reference to FIGS. 3A and 3B.

FIG. 7B is a schematic, side cross-sectional view of the turret assembly 410 during a landing operation. More specifically, the aircraft 400 is performing a belly landing and the turret assembly 410 impacts the ground G at an impact point 460. The force of impact (as shown by the arrow I) causes the turret assembly 410 to move both upward and backward relative to the aircraft 400 and brings the surveillance dome 420 into contact with one or more engagement portions 450. As discussed previously, when the turret assembly 410 moves into contact with one or more engagement portions 450 after impact with the ground G, the corresponding engagement portions 450 restrict or otherwise limit movement of the turret assembly 410 toward the aircraft 400. The excess impact or landing forces are transferred from the turret assembly 410 to other portions of the aircraft 400 via the engagement portions 450.

In one particular aspect of this embodiment, before contact with the ground G, the turret assembly 410 can be positioned in one or more "landing positions" to protect the sensitive components of the device 212 and the surveillance dome 420. The turret assembly 410, for example, is configured to rotate approximately 180 degrees about the roll axis 229 (as shown by the arrow R) to (a) position the protective portion 430 for direct impact with the ground G, and (b) orient a front portion of the device 212 and sensitive portions of the surveillance dome 420 away from the impact point 460.

In another particular aspect of this embodiment, the support assembly 240 and/or a frame 470 supporting at least a portion of the support assembly 240 is configured to elastically deflect far enough during landing to allow the turret assembly 410 to make contact with one or more engagement portions 450. In the illustrated embodiment, for example, the support assembly 240 flexes an angle $F_3$ relative to the support assembly's pre-impact position before the engagement portions 450 contact and limit the upward and backward movement of the turret assembly 410. The amount of flexing the support assembly 240 can withstand is based on the various factors discussed above with reference to FIGS. 3B and 5B. In the illustrated embodiment, the frame 470 supporting at least a portion of the support assembly 240 flexes in addition to, or in lieu of, the support assembly 240 itself until the turret assembly 410 contacts the corresponding engagement portions 450. One advantage of this arrangement is that the frame 470 supports the support assembly 240 during flexing and, in cooperation with the engagement portions 450, can help prevent damage to the turret assembly 410 during landing operations.

Figure 7C:
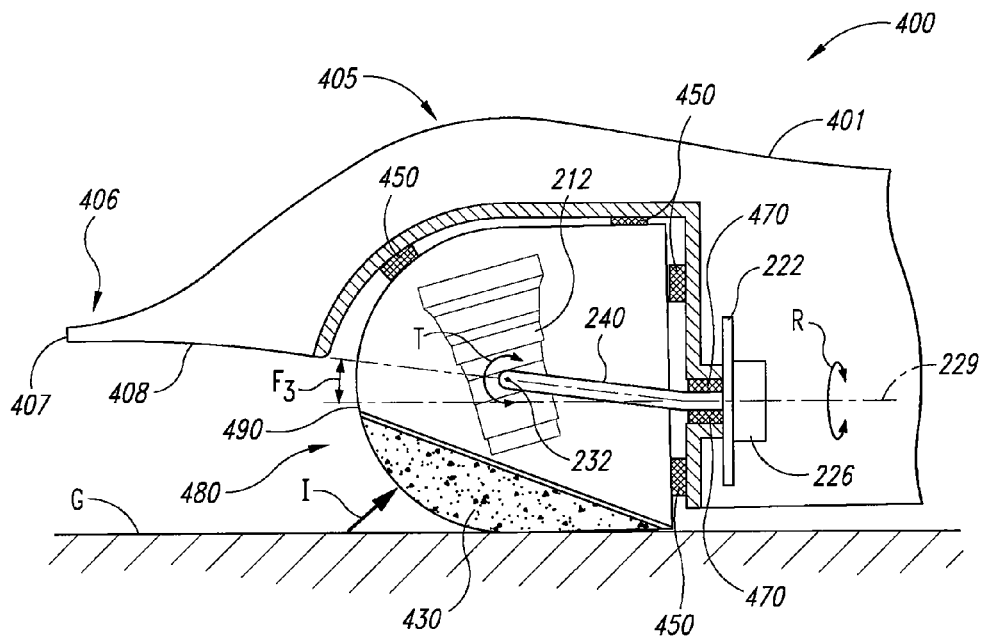
FIG. 7C is a schematic illustration of a turret assembly configured in accordance with yet another embodiment of the disclosure.

FIG. 7C is a schematic illustration of a turret assembly 480 configured in accordance with yet another embodiment of the disclosure. The turret assembly 480 can be generally similar to the turret assembly 410 described above with reference to FIGS. 7A and 7B, except that the turret assembly 480 includes a surveillance dome 490 having a different configuration than the surveillance dome 420. More specifically, the surveillance dome 490 includes a generally "silo-shaped" configuration. Similar to the surveillance dome 420 described above, the surveillance dome 490 is configured to move into contact with one or more engagement portions 450 after impact with the ground G.

Figure 8A:
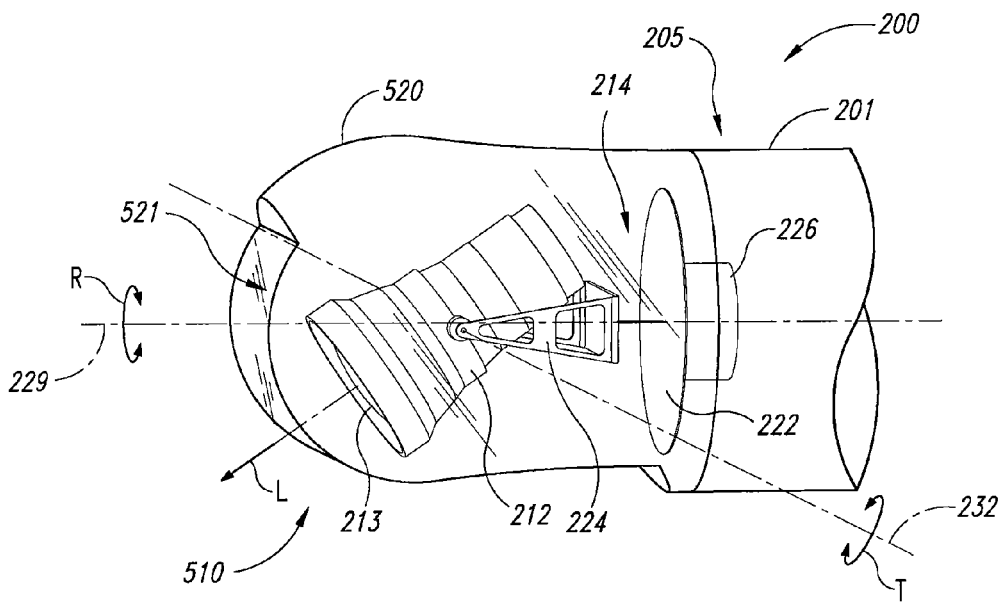
FIGS. 8A-8C are partially schematic, isometric views of a portion of an unmanned aircraft including a turret assembly rotatably moved to three different positions in accordance with yet another embodiment of the disclosure.
Figure 8B:
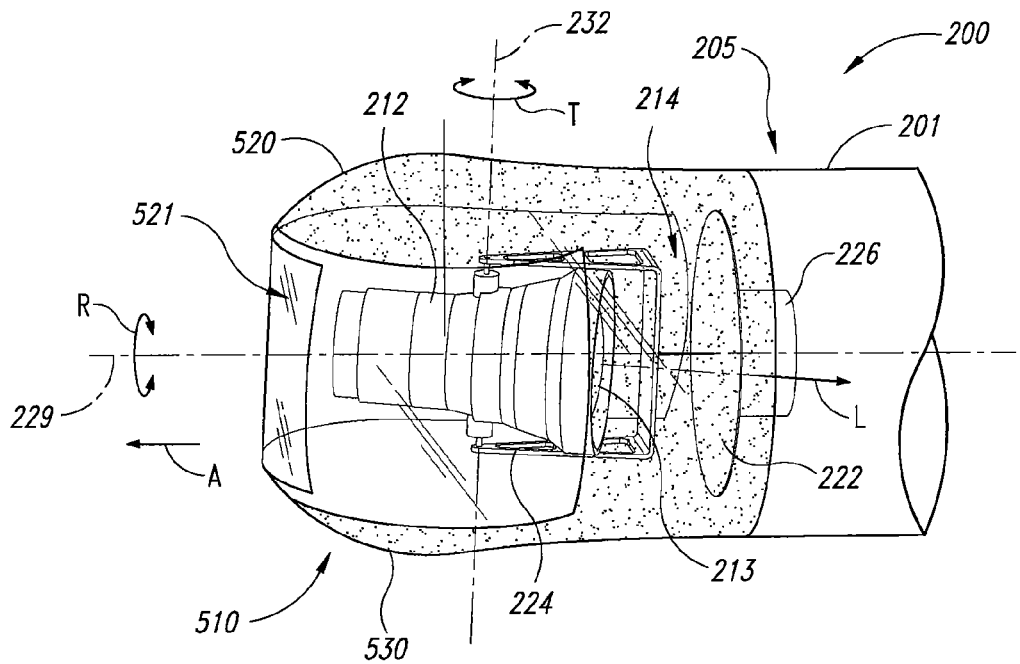
Figure 8C:
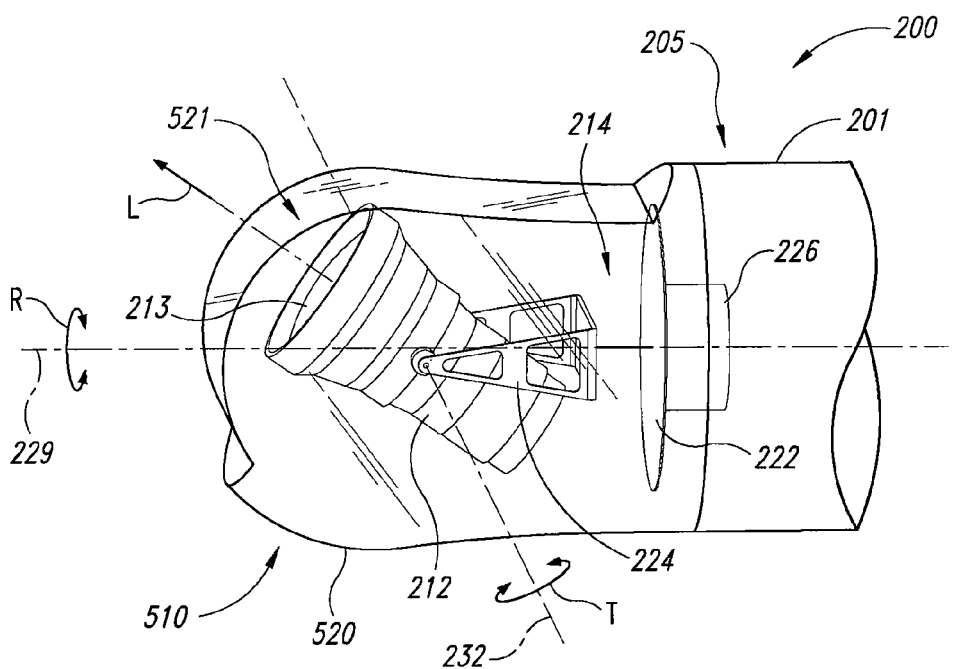

FIGS. 8A-8C are partially schematic, isometric views of a portion of the aircraft 200 including a turret assembly 510 rotatably moved to three different positions in accordance with still another embodiment of the disclosure. More specifically, FIG. 8A illustrates the turret assembly 510 in a first position (e.g., a normal airborne operational position) relative to the aircraft 200, while FIGS. 8B and 8C illustrate the turret assembly 510 in a second position and a third position, respectively, relative to the aircraft 200. The second and third positions are "landing positions" in which, as described previously, the turret assembly 510 is positioned for a belly landing or other high-impact operations.

The turret assembly 510 can be generally similar to the turret assembly 210 described above with reference to FIGS. 4A and 4B, except that the turret assembly 510 includes a surveillance dome 520 having a different configuration than the surveillance dome 220 described previously. More specifically, the surveillance dome 520 includes a strip-shaped window 521 aligned with the aperture 213 of the device 212. The window 521 can be generally transparent to the radiation at which the device 212 is sensitive, while the rest of the surveillance dome 520 can be translucent and/or opaque to this radiation. For example, when the device 212 is sensitive to infrared radiation, the window 521 can be transparent to infrared radiation. The shape of the window 521 can be configured to accommodate the motion of the line of sight L of the device 212 as the device 212 moves about the roll axis 229 (as shown by the arrow R) and the tilt axis 232 (as shown by the arrow T).

One feature of the arrangement of the surveillance dome 520 of FIG. 8A is that the window 521 occupies less than the entire surface area of the surveillance dome 520. The window 521, for example, can include a relatively small, strip-shaped slit in the surveillance dome 520. As discussed previously, an advantage of this arrangement is that the amount of transparent material (which can be costly) required for the surveillance dome 520 can be reduced as compared with other arrangements. A further advantage is that the material forming the window 521 may be difficult to form into complex shapes. By forming the window 521 from a single, flat, strip-shaped piece of material, the window 521 can be bent or curved in a single direction (e.g., about the tilt axis 232) rather than being curved in a compound manner. In any of these embodiments, the window 521 can be formed from a single pane or multiple panes.

As mentioned previously, FIG. 8B illustrates the turret assembly 510 in a second position relative to the aircraft 200 after (a) an outer stage of the turret assembly 510 has been rotated approximately 90 degrees clockwise or counterclockwise about the roll axis 229, and (b) an inner stage of the turret assembly 510 has been rotated approximately 180 degrees clockwise or counterclockwise about the tilt axis 232 such that the camera's line of sight L is pointing substantially away from the aircraft's direction of travel (as indicated by the arrow A). One particular aspect of the embodiment illustrated in FIG. 8B is that after rotating the turret assembly 510 approximately 90 degrees clockwise or counterclockwise about the roll axis 229, a protective portion 530 of the surveillance dome 520 is positioned for direct impact with the ground (not shown). The protective portion 530 is not illustrated in FIG. 8A or 8C to avoid obscuring other aspects of the turret assembly 510. As discussed above, the protective portion 530 is configured as a "skid pad" to help protect the delicate portions of the surveillance dome 520 during direct impact with the ground. The protective portion 530 can be generally similar to the protective portions 230/330/430 described previously.

The arrangement of the turret assembly 510 illustrated in FIG. 8B can also include several other aspects generally similar to those discussed above. For example, the camera 212 and the strip-shaped window 521 are pointed away from the potential impact zone. Furthermore, the turret assembly 510 is oriented such that the tilt axis 232 is generally transverse to the aircraft's direction of travel (as indicated by the arrow A) and, accordingly, the turret assembly 510 will not be "backdriven" about the tilt axis 232 upon impact with the ground and the tilt actuator (not shown) will not be subjected to excessive rotational loads during landing.

FIG. 8C illustrates the turret assembly 510 in a third position relative to the aircraft 200 in which the turret assembly 510 has been rotated approximately 180 degrees clockwise or counterclockwise about the roll axis 229 from the first position such that the line of sight L is pointing at least partially upward (i.e., above a horizon relative to the aircraft 200). As with the configuration described above with reference to FIG. 8B, the front portion of the camera 212 and the strip-shaped window 521 are pointed away from the potential impact zone and are thus generally protected from rocks or other debris that could break through the surveillance dome 520 upon impact. Although three particular turret assembly orientations are illustrated in FIGS. 8A-8C, it will be appreciated that the turret assembly 510 can be oriented or moved to a variety of different operational positions relative to the aircraft 200, and a number of these different positions can have many of the same advantages as those described herein.

From the foregoing, it will be appreciated that specific embodiments of the disclosure have been described herein for purposes of illustration, but that various modifications may be made without deviating from the spirit and scope of the disclosure. For example, the systems described above are generally directed to two-axis gimbal systems. More specifically, the turret assemblies described above with reference to FIGS. 1-8C are directed to pan-over-tilt and roll-over-tilt configurations. In other embodiments, however, a turret assembly could be designed with a first gimbal axis oriented diagonally or skewed from the orthogonal coordinate system of the aircraft, and it would be possible using software to ortho-rectify the image for a viewer, and translate the coordinate system for a target location. Such a configuration can eliminate both the singularity straight down in the case of pan-over-tilt, and the singularity straight ahead in the case of roll-over-tilt. If there is a singularity in the field of regard, it becomes necessary to add a third axis of motion control. It would be possible to tilt the first axis of the turret so that there is no singularity in the working field of regard, and thereby simplify the gimbal mechanism by using software.

In other embodiments, additional degrees of motion can be integrated. For example, additional embodiments of the disclosure can include turret assemblies including gimbal systems with additional stages and/or degrees of freedom, or fewer stages and degrees of freedom. By way of example, a single axis turret may have a more specialized application, such as using just a roll axis for compensating bank angle in an orbital flight path, or using just tilt angle for mapping in a "lawnmower" flight path.

Further, in still other embodiments the payload carried by the turret assemblies can include one or more additional imaging devices or sensors positioned within the individual turret assemblies, including signal emitters as well as detectors. In addition, in other embodiments of the disclosure the gimbal system and corresponding payload (e.g., camera or other sensors) can rotate independent of the surveillance dome or housing, rather than the surveillance dome rotating in concert with the camera. Moreover, the turret assemblies described above can be mounted to aerial platforms other than unmanned aircraft (e.g., gliders, blimps, kites, parachutes, spacecraft, etc.), or unmanned aircraft having features different than those shown and described above.

Moreover, in yet other embodiments the engagement portions described above can have different arrangements and/or features. In several embodiments, for example, the engagement portions can be motorized or otherwise movable to allow them to move into contact with the turret assembly prior to impact. The movement of the engagement portions can be controlled using commands from the ground and/or an onboard system. In still other embodiments, the engagement portions can include latches or other suitable types of fasteners so that the individual engagement portions can releasably engage the turret assembly and hold the turret in place relative to the aircraft prior to impact. In several instances, this may reduce the bending of the corresponding support assembly and its components during landing or capture operations.

Aspects of the disclosure described in the context of particular embodiments may be combined or eliminated in other embodiments. Further, aspects of the disclosure described in the context of the specific systems of the aircraft can be implemented in other systems and/or can be implemented in vehicles or devices other than aircraft. More specifically, the protection of a delicate, articulated protuberance (e.g., a turret assembly) is important on most mobile platforms, and such protection can include activity-specific orientations, articulated skid pads, and/or mechanical deflection limits tailored to the particular platform. Accordingly, aspects of the disclosure described above can also be used with manned or unmanned underwater vehicles (e.g., ROVs, UUVs, AUVs), land vehicles (e.g., UGVs, mowers), and surface vehicles (e.g., boats). In addition, while advantages associated with certain embodiments of the disclosure have been described in the context of those embodiments, other embodiments may also exhibit such advantages, and not all embodiments need necessarily exhibit such advantages to fall within the scope of the disclosure. Accordingly, embodiments of the disclosure are not limited except as by the appended claims.

The invention claimed is:

1. An aircraft system, comprising:
   a turret assembly carried by an unmanned aircraft, the turret assembly including—
      a payload having a line of sight to a target;
      a support assembly carrying the payload, the support assembly being movable about a first axis and a second axis generally transverse to the first axis;
      a housing at least partially surrounding the payload; and
      a controller operably coupled to the support assembly to direct movement of the support assembly about at least one of the first axis and the second axis such that the line of sight is pointed away from a point of impact before the turret assembly contacts the ground or another external structure during landing or capture operations.

2. The aircraft system of claim 1, further comprising:
   one or more turret engagement portions carried by the aircraft proximate to the turret assembly and spaced apart from the turret assembly during airborne operation, the one or more engagement portions being positioned to engage the turret assembly during landing or capture operations and inhibit movement of the turret assembly to prevent the support assembly from exceeding a designed stress limit of the support assembly.

3. The aircraft system of claim 2 wherein the one or more engagement portions are composed of carbon, Kevlar, composite materials, aluminum, or rubber.

4. The aircraft system of claim 2 wherein the one or more engagement portions are positioned to limit movement of the turret assembly toward the aircraft after impact with the ground or another external structure.

5. The aircraft system of claim 2 wherein:
   the support assembly comprises a gimbal system carrying the payload and movable about the first axis and the second axis, and at least one of (a) a spindle operably coupled between the gimbal system and the aircraft to rotate the gimbal system about the first axis, (b) an elastomeric mount, (c) a portion of a frame of the aircraft, or (d) one or more bearings carried by the aircraft or turret assembly; and
   the one or more engagement portions are positioned to engage the turret assembly during landing or capture operations and inhibit movement of the turret assembly to prevent the components of the support assembly from flexing past their respective elastic limits.

6. The aircraft system of claim 1 wherein the support assembly comprises a gimbal system carrying the payload, and wherein the gimbal system further comprises:
   a first support coupled to a first actuator to pivotably move about the first axis, the first actuator being configured to pivot the first support about the first axis through a total angular range of about 360 degrees; and
   a second support carried by the first support and coupled to a second actuator to pivotably move about the second axis, the second support carrying the payload, wherein the second actuator is configured to pivot the second support about the second axis through a total angular range of about 360 degrees.

7. The aircraft system of claim 6 wherein the controller is programmed with instructions to direct movement of at least one of the first actuator and the second actuator such that the line of sight is pointed above a horizon relative to the aircraft.

8. The aircraft system of claim 6 wherein the controller is programmed with instructions to direct movement of at least one of the first actuator and the second actuator such that the line of sight is in a direction generally opposite to a direction of travel of the aircraft.

9. The aircraft system of claim 1 wherein the payload comprises a camera.

10. The aircraft system of claim 1 wherein the housing comprises a surveillance dome having one or more windows aligned with the line of sight, the one or more windows being transparent to a desired radiation.

11. The aircraft system of claim 10 wherein the housing comprises a generally strip-shaped window aligned with the line of sight.

12. The aircraft system of claim 1 wherein the housing is configured to rotatably move as a unit with the surveillance payload about the first axis and the second axis.

13. The aircraft system of claim 1 wherein the first axis includes a pan axis and the second axis includes a tilt axis.

14. The aircraft system of claim 1 wherein the first axis includes a roll axis and the second axis includes a tilt axis.

15. The aircraft system of claim 1, further comprising one or more protective portions carried by the housing and positioned to engage the ground or another external structure during landing operations.

16. The aircraft system of claim 15 wherein the one or more protective portions are in a first position relative to the aircraft during airborne operation, the first position being generally out of the line of sight, and wherein the controller is programmed with instructions to direct movement of the gimbal system about at least one of the first axis and the second axis such that the one or more protective portions are positioned to directly contact the ground or another external structure at the point of impact during landing or capture operations.

17. The aircraft system of claim 15 wherein the one or more protective portions are composed of one or more layers of hardened, aerodynamic material with one or more layers of softer, compressible material underneath the one or more hardened outer layers.

18. The aircraft system of claim 1, further comprising the unmanned aircraft, and wherein the turret assembly is carried proximate to a nose portion of the aircraft.

19. An aircraft system, comprising:
a turret assembly carried proximate to a nose portion of an unmanned aircraft, the turret assembly including—
an imaging device having an imaging aperture configured to receive radiation along a line of sight;
a gimbal system carrying the imaging device, the gimbal system including:
a pan axis spindle operably coupled between a first support and a pan actuator to rotate the first support about the pan axis; and
a second support carried by the first support and coupled to a tilt actuator to rotate about a tilt axis transverse to the pan axis, the second support carrying the imaging device;
a surveillance dome at least partially surrounding the imaging device and the gimbal system; and
a controller operably coupled to the gimbal system and programmed with instructions to direct movement of at least one of the pan actuator and the tilt actuator such that the line of sight is directed above a horizon relative to the aircraft before the surveillance dome contacts the ground or another external structure during landing or capture operations; and one or more turret engagement portions carried by the aircraft proximate to the turret assembly and spaced apart from the turret assembly during airborne operation, the one or more engagement portions being positioned to engage the turret assembly after the turret assembly impacts the ground or another external structure to limit movement of the turret assembly toward the aircraft and prevent the pan axis spindle from flexing past an elastic limit of the pan axis spindle.

20. The aircraft system of claim 19 wherein the controller is programmed with instructions to direct movement of at least one of the pan actuator and the tilt actuator such that the line of sight is in a direction generally opposite to a direction of travel of the aircraft before the surveillance dome contacts the ground or another external structure.

21. The aircraft system of claim 19 wherein:
the pan actuator is configured to rotate the first support about the pan axis through a total angular range of about 360 degrees; and
the tilt actuator is configured to rotate the second support about the tilt axis through a total angular range of about 360 degrees.

22. The aircraft system of claim 19 wherein the controller is programmed with instructions to direct movement of at least one of the pan actuator and the tilt actuator such that the tilt axis is oriented generally parallel with a direction of travel of the aircraft to inhibit the turret assembly from rotating about the tilt axis after landing.

23. The aircraft system of claim 19, further comprising one or more sacrificial skid pads carried by the surveillance dome and positioned to engage the ground or another external structure during landing or capture operations.

24. The aircraft system of claim 23 wherein the one or more skid pads are in a first position relative to the aircraft during airborne operation, the first position being generally out of the line of sight, and wherein the controller is programmed with instructions to direct movement of at least one of the pan actuator and the tilt actuator such that the one or more skid pads are positioned in a second position to directly contact the ground or another external structure at the point of impact during landing or capture operations.

25. The aircraft system of claim 19 wherein the surveillance dome rotatably moves as a unit with the imaging device about the pan axis and the tilt axis.

26. An aircraft system, comprising:
a turret assembly carried proximate to a nose portion of an unmanned aircraft, the turret assembly including—
an imaging device having an imaging aperture configured to receive radiation along a line of sight;
a gimbal system carrying the imaging device, the gimbal system including:
a roll axis spindle operably coupled between a first support and a roll actuator to rotate the first support about a roll axis, the roll axis being generally parallel to a longitudinal axis of the aircraft; and
a second support carried by the first support and coupled to a tilt actuator to rotate about a tilt axis transverse to the roll axis, the second support carrying the imaging device;
a surveillance dome at least partially surrounding the imaging device and the gimbal system; and
a controller operably coupled to the gimbal system and programmed with instructions to direct movement of at least one of the roll actuator and the tilt actuator such that the line of sight is directed above a horizon relative to the aircraft before the surveillance dome contacts the ground or another external structure during landing or capture operations; and one or more turret engagement portions carried by the aircraft proximate to the turret assembly and spaced apart from the turret assembly during airborne operation, the one or more engagement portions being positioned to engage the turret assembly after the turret assembly impacts the ground or another external structure during landing or capture operations to limit movement of the turret assembly toward the aircraft and prevent the roll axis spindle from flexing past its elastic limit.

27. The aircraft system of claim 26 wherein the controller is programmed with instructions to direct movement of at least one of the roll actuator and the tilt actuator such that the line of sight is in a direction generally opposite to a direction of travel of the aircraft before the surveillance dome contacts the ground or another external structure.

28. The aircraft system of claim 26 wherein:
the roll actuator is configured to rotate the first support about the roll axis through a total angular range of about 360 degrees; and
the tilt actuator is configured to rotate the second support about the tilt axis through a total angular range of about 360 degrees.

29. The aircraft system of claim 26 wherein the controller is programmed with instructions to direct movement of at least one of the pan actuator and the tilt actuator such that the roll axis is oriented generally parallel with a direction of travel of the aircraft to inhibit the turret assembly from rotating about the tilt axis after landing.

30. The aircraft system of claim 26, further comprising a labyrinth seal between the turret assembly and the aircraft, the labyrinth seal including a projection and a channel portion configured to receive at least a portion of the projection, and wherein the projection is configured to engage one or more corresponding turret engagement portions to inhibit movement of the turret assembly toward the aircraft after the turret assembly impacts the ground or external structure.

31. The aircraft system of claim 26, further comprising one or more sacrificial skid pads carried by the surveillance dome and positioned to directly engage the ground or external structure during landing or capture operations.

32. The aircraft system of claim 31 wherein the one or more skid pads are in a first position relative to the aircraft during airborne operation, the first position being generally out of the line of sight, and wherein the controller is configured to direct movement of at least one of the roll actuator and the tilt actuator such that the one or more skid pads are in a second position to directly contact the ground or external structure at the point of impact during landing or capture operations.

33. The aircraft system of claim 26 wherein the surveillance dome rotatably moves as a unit as a unit with the imaging device about the roll axis and the tilt axis.

34. A surveillance apparatus for tracking a target from the air, the surveillance apparatus comprising:
first support means;
first actuation means for rotating the first support means about a first axis;
second support means carried by the first support means and configured to carry a surveillance payload having a line of sight;
second actuation means for rotating the second support means relative to the first support means about a second axis transverse to the first axis;
housing means at least partially surrounding the surveillance payload; and control means to direct movement of at least one of the first actuation means and the second actuation means such that the line of sight of the surveillance payload is pointed away from a point of impact before the surveillance apparatus contacts the ground or another external structure during landing or capture operations.

35. The surveillance apparatus of claim 34, further comprising:
an unmanned aircraft, wherein the surveillance apparatus is carried proximate to a nose portion of the aircraft;
a spindle operably coupled between the first support means and the first actuation means and configured to rotate the first support means about the first axis; and
turret support means for preventing the spindle from flexing past an elastic limit of the spindle during landing or capture operations, the turret support means being carried by the aircraft proximate to the surveillance apparatus and spaced apart from the surveillance apparatus during airborne operation, wherein the turret support means are positioned to engage the surveillance apparatus after impact with the ground or external structure to inhibit movement of the surveillance apparatus relative to the aircraft.

36. The surveillance apparatus of claim 34, further comprising skid protection means carried by the housing means, the skid protection means being in a first position out of the line of sight during airborne operation and in a second position to directly contact the ground or external structure during landing or capture operations.

37. A vehicle, comprising:
a movable body;
a turret assembly carried by the body, the turret assembly including—
a payload having a line of sight to a target;
a gimbal system carrying the payload, wherein the gimbal system is movable about an axis;
a housing at least partially surrounding the payload and the gimbal system; and
a controller operably coupled to the gimbal system to direct movement of the gimbal system about the axis such that the line of sight is pointed away from a point of impact before the turret assembly contacts the ground or another external structure during operation.

38. The vehicle of claim 37 wherein the gimbal system further comprises a spindle operably coupled between the gimbal system and the body to rotate the gimbal system about the axis, and wherein the vehicle further comprises:
one or more turret engagement portions carried by the body proximate to the turret assembly and spaced apart from the turret assembly during operation, the one or more engagement portions being positioned to limit movement of the turret assembly toward the body after impact with the ground or another external structure to prevent the spindle from flexing past its elastic limit.

39. The vehicle of claim 38 wherein the one or more engagement portions are composed of carbon, Kevlar, composite materials, aluminum, or rubber.

40. The vehicle of claim 37 wherein the controller is programmed with instructions to direct movement of the gimbal system such that the line of sight is in a direction generally opposite to a direction of travel of the body.

41. The vehicle of claim 37 wherein the gimbal system is movable about a first axis and a second axis generally transverse to the first axis, and wherein the gimbal system further comprises:
a first support coupled to a first actuator to pivotably move about the first axis, the first actuator being configured to pivot the first support about the first axis through a total angular range of about 360 degrees; and a second support carried by the first support and coupled to a second actuator to pivotably move about the second axis, the second support carrying the payload, wherein the second actuator is configured to pivot the second support about the second axis through a total angular range of about 360 degrees.

42. The vehicle of claim 37 wherein the housing comprises a surveillance dome having one or more windows aligned with the line of sight, the one or more windows being transparent to a desired radiation.

43. The vehicle of claim 37, further comprising one or more skid pads carried by the housing and positioned to directly engage the ground or external structure during impact, wherein the one or more skid pads are in a first position relative to the vehicle during normal operation, the first position being generally out of the line of sight, and wherein the controller is configured to direct movement of the housing such that the one or more skid pads are in a second position to directly contact the ground or external structure at the point of impact before the turret assembly contacts the ground or external structure.

* * * * *